US010555347B2

(12) United States Patent
Xia

(10) Patent No.: US 10,555,347 B2
(45) Date of Patent: Feb. 4, 2020

(54) METHOD FOR CONFIGURING PRACH RESOURCE, METHOD FOR ACQUIRING RESOURCE CONFIGURATION, BASE STATION, AND USER EQUIPMENT

(71) Applicant: Huawei Technologies Co., Ltd., Shenzhen (CN)

(72) Inventor: Jinhuan Xia, Beijing (CN)

(73) Assignee: Huawei Technologies Co., Inc., Shenzhen (CN)

( * ) Notice: Subject to any disclaimer, the term of this patent is extended or adjusted under 35 U.S.C. 154(b) by 234 days.

(21) Appl. No.: 15/233,549

(22) Filed: Aug. 10, 2016

(65) Prior Publication Data
US 2016/0353486 A1 Dec. 1, 2016

Related U.S. Application Data

(63) Continuation of application No. PCT/CN2014/071937, filed on Feb. 10, 2014.

(51) Int. Cl.
*H04W 72/04* (2009.01)
*H04W 74/08* (2009.01)
*H04W 74/00* (2009.01)

(52) U.S. Cl.
CPC ..... *H04W 74/0833* (2013.01); *H04W 72/044* (2013.01); *H04W 74/006* (2013.01)

(58) Field of Classification Search
CPC ...... H04W 72/04; H04W 88/08; H04W 76/00
See application file for complete search history.

(56) References Cited

U.S. PATENT DOCUMENTS

2004/0230927 A1* 11/2004 Chen ..................... G06F 17/504
716/106
2009/0305693 A1 12/2009 Shimomura et al.
(Continued)

FOREIGN PATENT DOCUMENTS

CN 101569231 A 10/2009
CN 102547769 A 7/2012
(Continued)

OTHER PUBLICATIONS

3rd Generation Partnership Project;Technical Specification Group Radio Access Network;Evolved Universal Terrestrial Radio Access (E-UTRA); Radio Resource Control (RRC); Protocol specification (Release 12), Technical Specification, 3GPP TS 36.331 V12.0.0 (Dec. 2013), 349 pages.
(Continued)

*Primary Examiner* — Hassan A Phillips
*Assistant Examiner* — Prenell P Jones
(74) *Attorney, Agent, or Firm* — Slater Matsil, LLP

(57) ABSTRACT

The present invention relates to the field of communications, and in particular, to a method for configuring a physical random access channel (PRACH) resource, a method for acquiring a PRACH resource configuration, a base station, and user equipment. The method for configuring a resource includes configuring, by a base station, a supported coverage enhancement level and a PRACH resource corresponding to the coverage enhancement level, and transmitting, by the base station to user equipment, a resource index and/or resource configuration information of the PRACH resource configured for the coverage enhancement level, so that the user equipment acquires the corresponding PRACH resource, and transmits a preamble on the acquired PRACH resource.

20 Claims, 5 Drawing Sheets

(56) References Cited

U.S. PATENT DOCUMENTS

| 2014/0098761 | A1* | 4/2014 | Lee | H04W 74/006 |
| | | | | 370/329 |
| 2015/0016312 | A1* | 1/2015 | Li | H04W 74/0833 |
| | | | | 370/280 |
| 2016/0021681 | A1 | 1/2016 | Nan et al. | |
| 2016/0142981 | A1* | 5/2016 | Yi | H04J 11/0069 |
| | | | | 455/522 |
| 2016/0150570 | A1 | 5/2016 | Wang et al. | |
| 2016/0353440 | A1* | 12/2016 | Lee | H04W 4/70 |
| 2019/0239254 | A1* | 8/2019 | Su | H04H 20/38 |

FOREIGN PATENT DOCUMENTS

| CN | 103458528 | A | 12/2013 |
| EP | 2966920 | A1 | 1/2016 |
| KR | 100593595 | B1 | 6/2006 |
| WO | 2013060763 | A1 | 5/2013 |
| WO | 2014206311 | A1 | 12/2014 |

OTHER PUBLICATIONS

3rd Generation Partnership Project;Technical Specification Group Radio Access Network; Evolved Universal Terrestrial Radio Access (E-UTRA); Physical channels and modulation (Release 12), Technical Specification, 3GPP TS 36.211 V12.0.0 (Dec. 2013), 120 pages.

Huawei, Hisilicon; "Considerations on the Random Access of MTC UEs with Coverage Improvement"; Discussion and Decision; 3GPP TSG RAN WG1 Meeting #75; 6.2.2.2.2; R1-135020; San Francisco, USA, Nov. 11-15, 2013; 6 pages.

ZTE; "Physical Random Access Channel Coverage Enhancement"; 7.2.2.2.2; 3GPP TSG RAN WG1 Meeting #74b; Guangzhou, China; Oct. 7-11, 2013; R1-134303; 16 pages.

Interdigital; "PRACH Coverage Enhancement for MTC UE"; Discussion/Decision; 7.2.2.2.2; 3GPP TSG RAN WG1 Meeting #76; R1-140649; Prague, Czech Republic, Feb. 10-14, 2014; 4 pages.

* cited by examiner

METHOD FOR CONFIGURING PRACH RESOURCE, METHOD FOR ACQUIRING RESOURCE CONFIGURATION, BASE STATION, AND USER EQUIPMENT

CROSS-REFERENCE TO RELATED APPLICATIONS

This application is a continuation of International Application No. PCT/CN2014/071937, filed on Feb. 10, 2014, which is incorporated herein by reference in its entirety.

TECHNICAL FIELD

The present invention relates to the field of radio communications, and in particular, to a method for configuring a physical random access channel (PRACH) resource, a method for acquiring a PRACH resource configuration, a base station, and user equipment.

BACKGROUND

An actual coverage area of a cell is determined by various factors, including a carrier frequency, receiver performance of a terminal, and the like. During cell planning, on one hand, a carrier frequency is taken into consideration; on the other hand, a network is deployed in combination with a channel environment and receiver performance of a terminal. For example, on a built network or a network prepared and planned to be built, large-scale fading features of a majority of user terminals are similar, and in this case, the majority of terminals can be served within a transmission distance range of a carrier, that is, a cell can cover a distance within which these terminals are located. However, if there are a minority of terminals also within the distance in the coverage area of the cell, but a fading feature differs relatively greatly from that of the majority of terminals, receive power of a signal upon arrival at these terminals is particularly small, and these terminals cannot implement communication under sensitivity of receivers. For example, a terminal located in a basement has a signal receiving energy or power that is 10 dB to 20 dB less than that of a terminal located on the ground. How to ensure that these terminals located within a physical coverage area of a cell can still implement normal communication with a base station in a case of severe signal fading caused by an external factor is our current research topic.

A current research status of the topic is that a coverage enhancement technology is used for these terminals that are located in a severe fading environment, so that these terminals work in a coverage enhancement mode. In broad terms, in the used coverage enhancement technology, data is repeatedly transmitted within multiple transmission time intervals (TTI), and a receiver can receive and combine multiple copies, thereby improving detection performance. Certainly, how to configure a physical random access channel (PRACH) resource for user equipment that works in a coverage enhancement mode urgently needs to be resolved.

SUMMARY

In view of this, the embodiments provide a method for configuring a physical random access channel (PRACH) resource, a method for acquiring a PRACH resource configuration, a base station, and user equipment; therefore, a PRACH resource can be configured for user equipment that works in a coverage enhancement mode.

A first aspect of the embodiments provides a method for configuring a PRACH resource, where the method may include configuring, by a base station, a supported coverage enhancement level and a PRACH resource corresponding to the coverage enhancement level, and transmitting, by the base station to user equipment, a resource index and/or resource configuration information of the PRACH resource configured for the coverage enhancement level, so that the user equipment acquires the corresponding PRACH resource, and transmits a preamble on the acquired PRACH resource.

With reference to the first aspect, in a first feasible implementation manner, when configuring a supported coverage enhancement level and a PRACH resource corresponding to each coverage enhancement level, the base station configures a coverage enhancement level currently supported by the base station and a PRACH resource corresponding to the coverage enhancement level, or configures all coverage enhancement levels supported by the base station and PRACH resources corresponding to the coverage enhancement levels and indicates a coverage enhancement level currently supported by the base station.

With reference to the first aspect or the first feasible implementation manner of the first aspect, in a second feasible implementation manner, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble; and when the resource includes the time-domain resource, the base station transmits, to the user equipment, a resource index of a time-domain resource configured for the one or more coverage enhancement levels, where each index is corresponding to resource configuration information of one time-domain resource.

With reference to the second feasible implementation manner of the first aspect, in a third feasible implementation manner, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for the enhanced transmission of the preamble and a starting radio frame number used to transmit the preamble within each radio frame period, to determine the radio frame period for the enhanced transmission of the preamble and the starting radio frame number, where the radio frame period and the starting radio frame number are corresponding to the resource index.

With reference to the second or third feasible implementation manner of the first aspect, in a fourth feasible implementation manner, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the base station specifically configures a starting frame number list used to transmit the preamble within each radio frame period and a quantity of radio frames used to continuously transmit the preamble after each starting frame, so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index.

With reference to the fourth feasible implementation manner of the first aspect, in a fifth feasible implementation manner, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level.

With reference to any one of the second to fifth feasible implementation manners of the first aspect, in a sixth feasible implementation manner, when configuring a supported coverage enhancement level and a PRACH resource corresponding to each coverage enhancement level, the base station configures a same preamble format for different coverage enhancement levels or configures different preamble formats for different coverage enhancement levels respectively.

With reference to any one of the first aspect to the sixth feasible implementation manner of the first aspect, in a seventh feasible implementation manner, the PRACH resource includes a frequency-domain resource, configuration information of the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at different coverage enhancement levels supported by the base station; and when the resource includes the frequency-domain resource, the base station transmits, to the user equipment, the frequency offset value configured for the coverage enhancement level.

With reference to any one of the seventh feasible implementation manner of the first aspect, in an eighth feasible implementation manner, the base station configures a same frequency offset value for different coverage enhancement levels, to indicate a same offset of starting locations, with respect to the starting location of the carrier frequency band, for enhanced transmissions of preambles at all coverage enhancement levels supported by the base station; or the base station configures a same frequency offset value for different coverage enhancement levels, to indicate same frequency separation between each coverage enhancement level and a previous adjacent coverage enhancement level; or the base station configures multiple different frequency offset values, where each frequency offset value is used to indicate a frequency offset of a starting location, with respect to the starting location of the carrier frequency band, for an enhanced transmission of a preamble at a coverage enhancement level.

With reference to any one of the second to eighth feasible implementation manners of the first aspect, in a ninth feasible implementation manner, the PRACH resource further includes a codeword resource; configuration information of the codeword resource includes at least one of the following configured for each coverage enhancement level: a total quantity of preambles, a quantity of preambles corresponding to a group A, or a root sequence; and when the resource includes the codeword resource, the base station transmits, to the user equipment, the configuration information of the codeword resource configured for each coverage enhancement level, so that when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or so that when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or so that when the user equipment does not receive the configuration information of the codeword resource, the user equipment uses configuration information of a codeword resource configured for a non-coverage enhancement level, to obtain a codeword for an enhanced transmission of the preamble.

A second aspect of embodiments provide a method for acquiring a PRACH resource configuration, where the method may include receiving, by user equipment, a resource index and/or resource configuration information of a PRACH resource configured for a coverage enhancement level by a base station, and acquiring, by the user equipment, the corresponding PRACH resource according to the received resource index and/or resource configuration information, and transmitting a preamble on the acquired PRACH resource.

With reference to the second aspect, in a first feasible implementation manner, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble; and when the resource includes the time-domain resource, the user equipment receives a resource index of a time-domain resource configured for the one or more coverage enhancement levels by the base station, where each index is corresponding to resource configuration information of one time-domain resource.

With reference to the first feasible implementation manner of the second aspect, in a second feasible implementation manner, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

With reference to the first or second feasible implementation manner of the second aspect, in a third feasible implementation manner, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the base station specifically configures a starting frame number list used to transmit the preamble within each radio frame period and a quantity of radio frames used to continuously transmit the preamble after each starting frame, so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index.

With reference to the third feasible implementation manner of the second aspect, in a fourth feasible implementation manner, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level.

With reference to any one of the second aspect to the fourth feasible implementation manner of the second aspect, in a fifth feasible implementation manner, the PRACH resource includes a frequency-domain resource, the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the user equipment receives the frequency offset value configured for the coverage enhancement level by the base station.

With reference to the fifth feasible implementation manner of the second aspect, in a sixth feasible implementation manner, the user equipment receives a same frequency offset value configured for different coverage enhancement levels by the base station and uses the same frequency offset value as an offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the user equipment receives a same frequency offset value configured for different coverage enhancement levels by the base station, and uses the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the user equipment receives a frequency offset value configured for each coverage enhancement level by the base station, and uses the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

With reference to any one of the first to sixth feasible implementation manners of the second aspect, in a seventh feasible implementation manner, the PRACH resource further includes a codeword resource; configuration information of the codeword resource includes at least one of the following configured for each coverage enhancement level: a total quantity of preambles, a quantity of preambles corresponding to a group A, or a root sequence; and when the resource includes the codeword resource, the user equipment receives the configuration information of the codeword resource configured for each coverage enhancement level by the base station.

With reference to the seventh feasible implementation manner of the second aspect, in an eighth feasible implementation manner, when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or when the user equipment does not receive the configuration information of the codeword resource, the user equipment uses configuration information of a codeword resource configured for a non-coverage enhancement level, to obtain a codeword for an enhanced transmission of the preamble.

A third aspect of embodiments of embodiments provide a base station, where the base station may include: a configuration module, configured to configure a supported coverage enhancement level and a PRACH resource corresponding to the coverage enhancement level; and a transmission module, configured to transmit, to user equipment, a resource index and/or resource configuration information of the PRACH resource configured for the coverage enhancement level, so that the user equipment acquires the corresponding PRACH resource, and transmits a preamble on the acquired PRACH resource.

With reference to the third aspect, in a first feasible implementation manner, the configuration module is specifically configured to: configure a coverage enhancement level currently supported by the base station and a PRACH resource corresponding to the coverage enhancement level, or configure all coverage enhancement levels supported by the base station and PRACH resources corresponding to the coverage enhancement levels and indicate a coverage enhancement level currently supported by the base station.

With reference to the third aspect or the first feasible implementation manner of the third aspect, in a second feasible implementation manner, the PRACH resource configured by the configuration module includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble; and when the resource includes the time-domain resource, the transmission module is specifically configured to transmit, to the user equipment, a resource index of a time-domain resource configured for the one or more coverage enhancement levels, where each index is corresponding to resource configuration information of one time-domain resource.

With reference to the second feasible implementation manner of the second aspect, in a third feasible implementation manner, when configuring the density of the enhanced transmission opportunities of the preamble and the enhanced transmission opportunity of the preamble at the density, the configuration module specifically configures a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

With reference to the second or third feasible implementation manner of the second aspect, in a fourth feasible implementation manner, when configuring the quantity of repetitions for each enhanced transmission of the preamble, the configuration module specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the configuration module specifically configures a starting frame number list used to transmit the preamble within each radio frame period and a quantity of radio frames used to continuously transmit the preamble after each starting frame, so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index.

With reference to the fourth feasible implementation manner of the third aspect, in a fifth feasible implementation manner, when configuring the quantity of repetitions for each enhanced transmission of the preamble, the configuration module further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level.

With reference to any one of the second to fifth feasible implementation manners of the third aspect, in a sixth feasible implementation manner, when configuring a supported coverage enhancement level and a PRACH resource corresponding to each coverage enhancement level, the configuration module configures a same preamble format for different coverage enhancement levels or configures different preamble formats for different coverage enhancement levels respectively.

With reference to any one of the third aspect to the sixth feasible implementation manner of the third aspect, in a seventh feasible implementation manner, the PRACH resource configured by the configuration module includes a frequency-domain resource, configuration information of the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the base station transmits, to the user equipment, a frequency offset value configured for each coverage enhancement level.

With reference to any one of the seventh feasible implementation manner of the third aspect, in an eighth feasible implementation manner, the configuration module configures a same frequency offset value for different coverage enhancement levels, to indicate a same offset of starting locations, with respect to the starting location of the carrier frequency band, for enhanced transmissions of preambles at all coverage enhancement levels supported by the base station; or the configuration module configures a same frequency offset value for different coverage enhancement levels, to indicate same frequency separation between each coverage enhancement level and a previous adjacent coverage enhancement level; or the configuration module configures multiple different frequency offset values, where each frequency offset value is used to indicate a frequency offset of a starting location, with respect to the starting location of the carrier frequency band, for an enhanced transmission of a preamble at a coverage enhancement level.

With reference to any one of the second to eighth feasible implementation manners of the third aspect, in a ninth feasible implementation manner, the PRACH resource configured by the configuration module further includes a codeword resource, and configuration information of the codeword resource configured by the configuration module includes at least one of the following configured for each coverage enhancement level: a total quantity of preambles, a quantity of preambles corresponding to a group A, or a root sequence; and when the resource includes the codeword resource, the transmission module transmits, to the user equipment, the configuration information of the codeword resource configured for each coverage enhancement level, so that when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or so that when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or so that when the user equipment does not receive the configuration information of the codeword resource, the user equipment uses configuration information of a codeword resource configured for a non-coverage enhancement level, to obtain a codeword for an enhanced transmission of the preamble.

A fourth aspect of the embodiments provide a base station, where the base station may include a memory, a processor, and a transmission apparatus, where the processor invokes a program stored in the memory, to configure a coverage enhancement level supported by the base station and a PRACH resource corresponding to the coverage enhancement level; and the transmission apparatus is configured to transmit, to user equipment, a resource index and/or resource configuration information of the PRACH resource configured for the coverage enhancement level by the processor, so that the user equipment acquires the corresponding PRACH resource, and transmits a preamble on the acquired PRACH resource.

With reference to the fourth aspect, in a first feasible implementation manner, the processor is specifically configured to: configure a coverage enhancement level currently supported by the base station and a PRACH resource corresponding to the coverage enhancement level, or configure all coverage enhancement levels supported by the base station and PRACH resources corresponding to the coverage enhancement levels and indicate a coverage enhancement level currently supported by the base station.

With reference to the fourth aspect or the first feasible implementation manner of the fourth aspect, in a second feasible implementation manner, the PRACH resource configured by the processor includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble; and when the resource includes the time-domain resource, the transmission apparatus is specifically configured to transmit, to the user equipment, a resource index of a time-domain resource configured for the one or more coverage enhancement levels, where each index is corresponding to resource configuration information of one time-domain resource.

With reference to the second feasible implementation manner of the fourth aspect, in a third feasible implementation manner, when configuring the density of the enhanced transmission opportunities of the preamble and the enhanced transmission opportunity of the preamble at the density, the processor specifically configures a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

With reference to the second or third feasible implementation manner of the fourth aspect, in a fourth feasible implementation manner, when configuring the quantity of repetitions for each enhanced transmission of the preamble, the processor specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the processor specifically configures a starting frame number list used to transmit the preamble within each radio frame period and a quantity of radio frames used to continuously transmit the preamble after each starting frame, so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index.

With reference to the fourth feasible implementation manner of the fourth aspect, in a fifth feasible implementation manner, when configuring the quantity of repetitions for each enhanced transmission of the preamble, the processor further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level.

With reference to any one of the second to fifth feasible implementation manners of the fourth aspect, in a sixth feasible implementation manner, when configuring a supported coverage enhancement level and a PRACH resource corresponding to each coverage enhancement level, the processor configures a same preamble format for different coverage enhancement levels or configures different preamble formats for different coverage enhancement levels respectively.

With reference to any one of the fourth aspect to the sixth feasible implementation manner of the fourth aspect, in a seventh feasible implementation manner, the PRACH resource configured by the processor includes a frequency-domain resource, configuration information of the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the transmission apparatus is specifically configured to transmit, to the user equipment, a frequency offset value configured for each coverage enhancement level.

With reference to any one of the seventh feasible implementation manner of the fourth aspect, in an eighth feasible implementation manner, the processor configures a same frequency offset value for different coverage enhancement levels, to indicate a same offset of starting locations, with respect to the starting location of the carrier frequency band, for enhanced transmissions of preambles at all coverage enhancement levels supported by the base station; or the processor configures a same frequency offset value for different coverage enhancement levels, to indicate same frequency separation between each coverage enhancement level and a previous adjacent coverage enhancement level; or the processor configures multiple different frequency offset values, where each frequency offset value is used to indicate a frequency offset of a starting location, with respect to the starting location of the carrier frequency band, for an enhanced transmission of a preamble at a coverage enhancement level.

With reference to any one of the second to eighth feasible implementation manners of the fourth aspect, in a ninth feasible implementation manner, the PRACH resource configured by the processor further includes a codeword resource, and configuration information of the codeword resource configured by the processor includes at least one of the following configured for each coverage enhancement level: a total quantity of preambles, a quantity of preambles corresponding to a group A, or a root sequence; and when the resource includes the codeword resource, the transmission apparatus is specifically configured to transmit, to the user equipment, the configuration information of the codeword resource configured for each coverage enhancement level, so that when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or so that when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or so that when the user equipment does not receive the configuration information of the codeword resource, the user equipment uses configuration information of a codeword resource configured for a non-coverage enhancement level, to obtain a codeword for an enhanced transmission of the preamble.

A fifth aspect of the embodiments provide user equipment, where the user equipment may include: a receiving module, configured to receive a resource index and/or resource configuration information of a PRACH resource configured for a coverage enhancement level by a base station; and a processing module, configured to: acquire the corresponding PRACH resource according to the resource index and/or resource configuration information received by the receiving module, and transmit a preamble on the acquired PRACH resource.

With reference to the fifth aspect, in a first feasible implementation manner, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble; and when the resource includes the time-domain resource, the receiving module is specifically configured to receive a resource index of a time-domain resource configured for the one or more coverage enhancement levels by the base station, where each index is corresponding to resource configuration information of one time-domain resource.

With reference to the first feasible implementation manner of the fifth aspect, in a second feasible implementation manner, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period; and the processing module is specifically configured to: after the receiving module receives the resource index of the time-domain resource configured for the coverage enhancement level by the base station, query for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

With reference to the first or second feasible implementation manner of the fifth aspect, in a third feasible implementation manner, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble; and the processing module is specifically configured to: after the receiving module receives all resource indexes of time-domain resources configured for the coverage enhancement level by the base station, query, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the base station specifically configures a starting frame number list used to transmit the preamble within each radio frame period and a quantity of radio frames used to continuously transmit the preamble after each starting frame; and the processing module is specifically configured to: after the receiving module receives the resource index of the time-domain resource configured for the coverage enhancement level by the base station, query for the starting frame number list used to transmit the preamble within each radio frame period and the quantity of radio frames used to continuously transmit the preamble after each starting frame, where the list and the quantity are corresponding to the resource index.

With reference to the third feasible implementation manner of the fifth aspect, in a fourth feasible implementation manner, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level; and the processing module is specifically configured to: after the receiving module receives the resource index of the time-domain resource configured for the coverage enhancement level by the base station, query for the quantity of subframe numbers or the subframe number, where the subframe number is used to transmit the preamble in each radio frame, and the quantity or the subframe number is corresponding to the resource index; or the processing module is specifically configured to: after the receiving module receives the resource index of the time-domain resource configured for the coverage enhancement level by the base station, query for the quantity, corresponding to the resource index, of subframe numbers that are used to transmit the preamble in each radio frame, and after the receiving module receives a resource index configured for a resource at the non-coverage enhancement level by the base station, query for a subframe number that is used to transmit the preamble in each radio frame and that is corresponding to the resource index configured for the resource at the non-coverage enhancement level.

With reference to any one of the fifth aspect to the fourth feasible implementation manner of the fifth aspect, in a fifth feasible implementation manner, the PRACH resource includes a frequency-domain resource, the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the receiving module is specifically configured to receive the frequency offset value configured for the coverage enhancement level by the base station.

With reference to the fifth feasible implementation manner of the fifth aspect, in a sixth feasible implementation manner, the receiving module is specifically configured to receive a same frequency offset value configured for different coverage enhancement levels by the base station, and the processing module is specifically configured to use the same frequency offset value as an offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the receiving module is specifically configured to receive a same frequency offset value configured for different coverage enhancement levels by the base station, and the processing module is specifically configured to use the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the receiving module is specifically configured to receive a frequency offset value configured for each coverage enhancement level by the base station, and the processing module is specifically configured to use the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

With reference to any one of the first to sixth feasible implementation manners of the fifth aspect, in a seventh feasible implementation manner, the PRACH resource further includes a codeword resource; configuration information of the codeword resource includes at least one of the following configured for each coverage enhancement level: a total quantity of preambles, a quantity of preambles corresponding to a group A, or a root sequence; and when the resource includes the codeword resource, the receiving module is specifically configured to receive the configuration information of the codeword resource configured for each coverage enhancement level by the base station.

With reference to the seventh feasible implementation manner of the fifth aspect, in an eighth feasible implementation manner, the processing module is specifically configured to: when the receiving module receives the configuration information of the codeword resource including the total quantity of preambles, the quantity of preambles corresponding to the group A, and the root sequence that are configured for each coverage enhancement level, use the codeword information configured for the coverage enhancement level, to obtain a codeword for an enhanced transmission of the preamble; or the processing module is specifically configured to: when the receiving module receives the resource configuration information of the codeword resource including only a part of the following configured for each coverage enhancement level: the total quantity of preambles, the quantity of preambles corresponding to the group A, or the root sequence, use the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or the processing module is specifically configured to: when the receiving module does not receive the configuration information of the codeword resource, use configuration information of a codeword resource configured for a non-coverage enhancement level, to obtain a codeword for an enhanced transmission of the preamble.

A sixth aspect of the embodiments provides user equipment, where the user equipment may include a memory, a processor, and a receiving apparatus, where the receiving apparatus is configured to receive a resource index and/or resource configuration information of a PRACH resource configured for a coverage enhancement level by a base station; and the processor is configured to: execute a program stored in the memory, so as to acquire the corresponding PRACH resource according to the resource index and/or resource configuration information received by the receiving apparatus, and transmit a preamble on the acquired PRACH resource.

With reference to the sixth aspect, in a first feasible implementation manner, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble; and when the resource includes the time-domain resource, the receiving apparatus is specifically configured to receive a resource index of a time-domain resource configured for the one or more coverage enhancement levels by the base station, where each index is corresponding to resource configuration information of one time-domain resource.

With reference to the first feasible implementation manner of the sixth aspect, in a second feasible implementation manner, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period; and the processor is specifically configured to: after the receiving apparatus receives the resource index of the time-domain resource configured for the coverage enhancement level by the base station, query for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

With reference to the first or second feasible implementation manner of the sixth aspect, in a third feasible implementation manner, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble; and the processor is specifically configured to: after the receiving apparatus receives all resource indexes of time-domain resources configured for the coverage enhancement level by the base station, query, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the base station specifically configures a starting frame number list used to transmit the preamble within each radio frame period and a quantity of radio frames used to continuously transmit the preamble after each starting frame; and the processor is specifically configured to: after the receiving apparatus receives the resource index of the time-domain resource configured for the coverage enhancement level by the base station, query for the starting frame number list used to transmit the preamble within each radio frame period and the quantity of radio frames used to continuously transmit the preamble after each starting frame, where the list and the quantity are corresponding to the resource index.

With reference to the third feasible implementation manner of the sixth aspect, in a fourth feasible implementation manner, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level; and the processor is specifically configured to: after the receiving apparatus receives the resource index of the time-domain resource configured for the coverage enhancement level by the base station, query for the quantity of subframe numbers or the subframe number, where the subframe number is used to transmit the preamble in each radio frame, and the quantity or the subframe number is corresponding to the resource index; or the processor is specifically configured to: after the receiving apparatus receives the resource index of the time-domain resource configured for the coverage enhancement level by the base station, query for the quantity, corresponding to the resource index, of subframe numbers that are used to transmit the preamble in each radio frame, and after the receiving apparatus receives a resource index configured for a resource at the non-coverage enhancement level by the base station, query for a subframe number that is used to transmit the preamble in each radio frame and that is corresponding to the resource index configured for the resource at the non-coverage enhancement level.

With reference to any one of the sixth aspect to the fourth feasible implementation manner of the sixth aspect, in a fifth feasible implementation manner, the PRACH resource includes a frequency-domain resource, the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the receiving apparatus is specifically configured to receive the frequency offset value configured for the coverage enhancement level by the base station.

With reference to the fifth feasible implementation manner of the sixth aspect, in a sixth feasible implementation manner, the receiving apparatus is specifically configured to receive a same frequency offset value configured for different coverage enhancement levels by the base station, and the processor is specifically configured to use the same frequency offset value as an offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the receiving apparatus is specifically configured to receive a same frequency offset value configured for different coverage enhancement levels by the base station, and the processor is specifically configured to use the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the receiving apparatus is specifically configured to receive a frequency offset value configured for each coverage enhancement level by the base station, and the processor is specifically configured to use the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

With reference to any one of the first to sixth feasible implementation manners of the sixth aspect, in a seventh feasible implementation manner, the PRACH resource further includes a codeword resource; configuration information of the codeword resource includes at least one of the following configured for each coverage enhancement level: a total quantity of preambles, a quantity of preambles corresponding to a group A, or a root sequence; and when the resource includes the codeword resource, the receiving apparatus is specifically configured to receive the configuration information of the codeword resource configured for each coverage enhancement level by the base station.

With reference to the seventh feasible implementation manner of the sixth aspect, in an eighth feasible implementation manner, the processor is specifically configured to: when the receiving apparatus receives the configuration information of the codeword resource including the total quantity of preambles, the quantity of preambles corresponding to the group A, and the root sequence that are configured for each coverage enhancement level, use the codeword information configured for the coverage enhancement level, to obtain a codeword for an enhanced transmission of the preamble; or the processor is specifically configured to: when the receiving apparatus receives the resource configuration information of the codeword resource including only a part of the following configured for each coverage enhancement level: the total quantity of preambles, the quantity of preambles corresponding to the group A, or the root sequence, use the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or the processor is specifically configured to: when the receiving apparatus does not receive the configuration information of the codeword resource, use configuration information of a codeword resource configured for a non-coverage enhancement level, to obtain a codeword for an enhanced transmission of the preamble.

A seventh aspect of the embodiments provides a computer storage medium, where the computer storage medium may store a program, and when the program is executed, some or all steps of the method for configuring a PRACH resource according to the embodiments may be included.

An eighth aspect of the embodiments provides a computer storage medium, where the computer storage medium may store a program, and when the program is executed, some or all steps of the method for acquiring a PRACH resource configuration according to the embodiments may be included.

It can be seen from above that in some feasible implementation manners of the embodiments, a base station configures a supported coverage enhancement level and a PRACH resource corresponding to the coverage enhancement level; and the base station transmits, to user equipment, a resource index and/or resource configuration information of the PRACH resource configured for the coverage enhancement level, so that the user equipment acquires the corresponding PRACH resource, and transmits a preamble on the acquired PRACH resource. Therefore, a PRACH resource can be configured for user equipment that works in a coverage enhancement mode.

DETAILED DESCRIPTION OF ILLUSTRATIVE EMBODIMENTS

Figure 1:
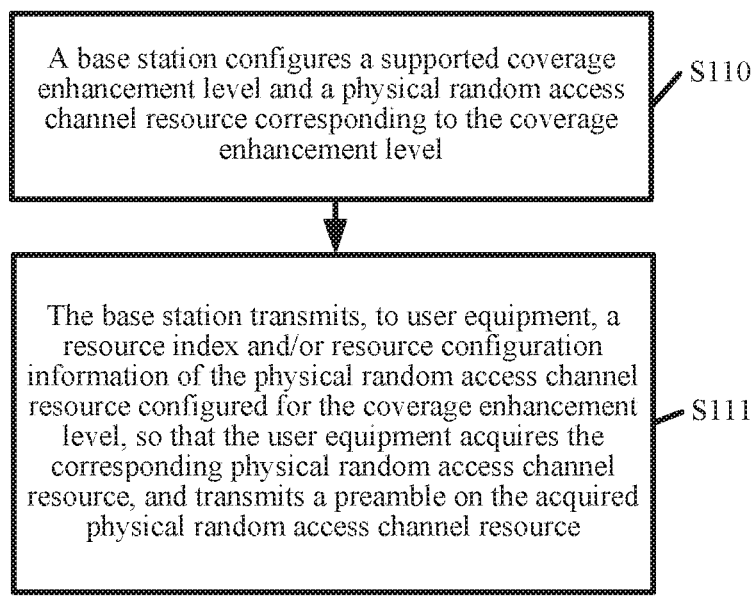
FIG. 1 is a schematic flowchart of an embodiment of a method for configuring a physical random access channel (PRACH) resource according to the embodiments.

FIG. 1 is a schematic flowchart of an embodiment of a method for configuring a physical random access channel (PRACH) resource according to embodiments. As shown in FIG. 1, the method may include.

Step S110: A base station configures a supported coverage enhancement level and a PRACH resource corresponding to the coverage enhancement level.

Step S111: The base station transmits, to user equipment, a resource index and/or resource configuration information of the PRACH resource configured for the coverage enhancement level, so that the user equipment acquires the corresponding PRACH resource, and transmits a preamble on the acquired PRACH resource.

During specific implementation, in step S110, when configuring a supported coverage enhancement level and a PRACH resource corresponding to the coverage enhancement level, the base station may configure a coverage enhancement level currently supported by the base station and a PRACH resource corresponding to the coverage enhancement level, or configure all coverage enhancement levels supported by the base station and PRACH resources corresponding to the coverage enhancement levels and indicate a coverage enhancement level currently supported by the base station.

Figure 2:
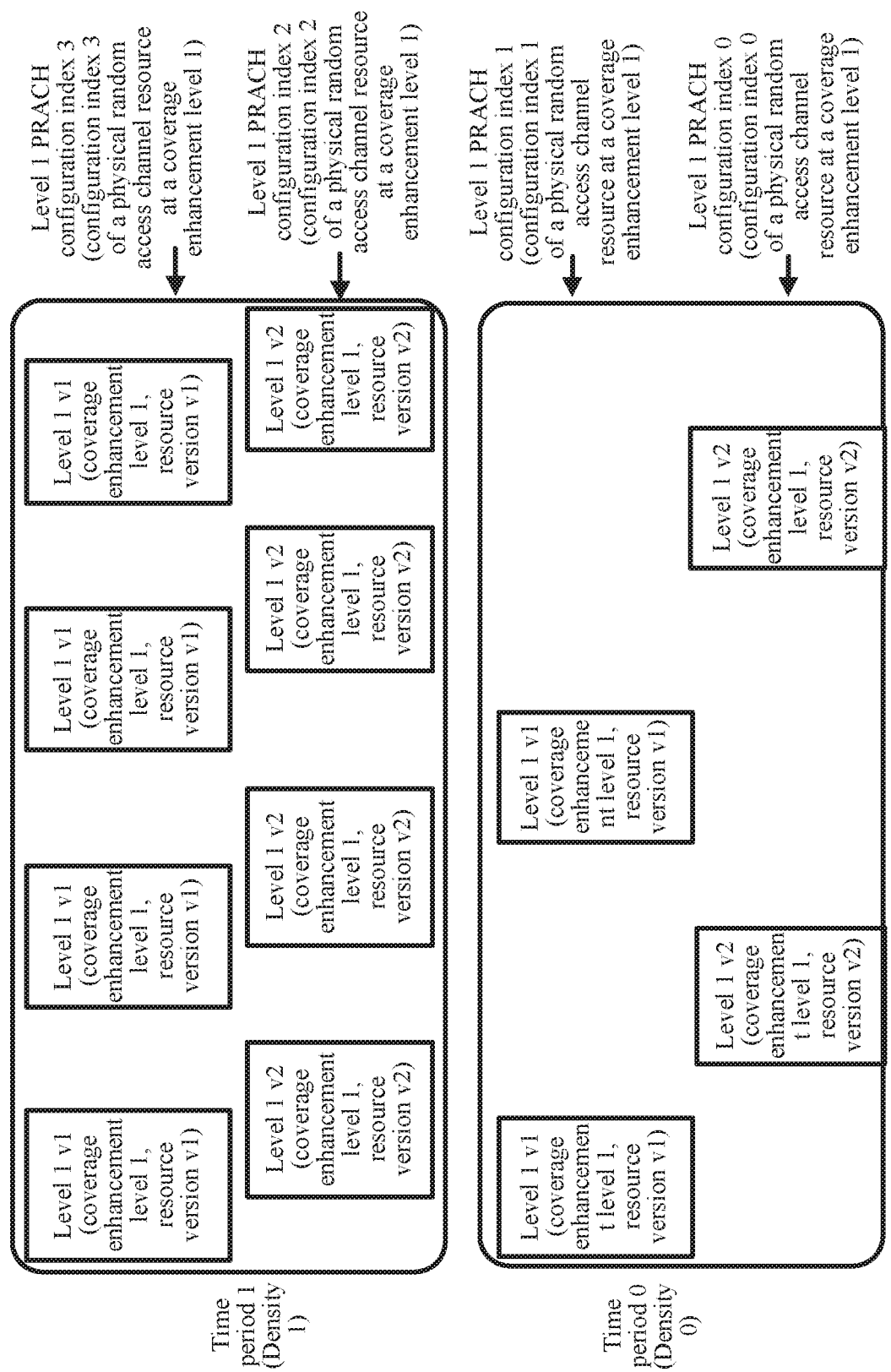
FIG. 2 is a schematic diagram of a time-domain resource configuration for an enhanced transmission opportunity of a preamble according to the embodiments.

During specific implementation, in step S110, the PRACH resource configured by the base station may include a time-domain resource, and resource configuration information of the time-domain resource may include at least one of: a preamble format, a density of enhanced transmission opportunities of a preamble, a transmission opportunity of a preamble for an enhanced transmission at a density, or a quantity of repetitions for each enhanced transmission of a preamble. In addition, the base station may configure a same preamble format for different coverage enhancement levels or configure different preamble formats for different coverage enhancement levels respectively. The density of the enhanced transmission opportunities of the preamble refers to a quantity of transmission opportunities that an enhanced transmission can be performed on the preamble within a time period. The transmission opportunity refers to a time-domain starting location of a radio frame for each enhanced transmission of the preamble within the time period. As shown in FIG. 2, using time periods Density 0 and Density 1 as an example, within the time period Density 0, there are only two enhanced transmission opportunities of a random preamble. That is, within the time Density 0, a density of the enhanced transmission opportunities of the preamble is 2. In addition, there may be two choices for the two enhanced transmission opportunities of the random preamble, namely, two resource versions, for example, Level 1 PRACH configuration index 0 (where 'Level 1' represents a coverage enhancement level, and 'V1' represents a resource version) and Level 1 PRACH configuration index 1 (where 'Level 1' represents a coverage enhancement level, and 'V2' represents a resource version). It can be known from FIG. 2 that, in the resource versions V1 and V2, time-domain starting locations of radio frames for an enhanced transmission of a preamble and quantities of radio frames are different. However, within the time period Density 1, there are four enhanced transmission opportunities for a random preamble. That is, within the time Density 1, a density of the enhanced transmission opportunities of the preamble is 4. In addition, there may also be two choices for the four enhanced transmission opportunities of the random preamble, namely, two resource versions, for example, Level 1 PRACH configuration index 2 (where 'Level 1' represents a coverage enhancement level, and 'V1' represents a resource version) and Level 1 PRACH configuration index 3 (where 'Level 1' represents a coverage enhancement level, and 'V2' represents a resource version).

During specific implementation, when the PRACH resource configured in step S110 includes a time-domain resource, a resource index may be further configured for the time-domain resource in this embodiment, where each index is corresponding to resource configuration information of one time-domain resource. In this way, before step S111, both the base station and the user equipment in this embodiment may store configuration information of a time-domain resource corresponding to a coverage enhancement level supported by a communications protocol, and in step S111, the base station may transmit, to the user equipment, the resource index of the PRACH resource configured for the coverage enhancement level, so that the user equipment queries for corresponding resource configuration information by using the index. Therefore, the base station may not need to transmit the detailed configuration information of the time-domain resource to the user equipment, which saves system resources.

During specific implementation, when configuring the density of the enhanced transmission opportunities of the preamble and the enhanced transmission opportunity of the preamble at the density, the base station may specifically configure a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for an enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index. For example, for the coverage enhancement level Level 1, the base station may configure, according to Table 1, a radio frame period for an enhanced transmission of a preamble as 80 radio frames, and configure a starting radio frame number list used to transmit the preamble within each radio frame period, as shown in the fourth column of Table 1. For example, assuming that an index of a time-domain resource received by the user equipment is 5, the user equipment learns, by means of query, that a radio frame period, corresponding to the resource index 5, for the enhanced transmission of the preamble is 80 radio frames and that starting radio frame numbers used to transmit the preamble within each radio frame period are the 20th frame and the 60th frame. Therefore, it is determined that, at the coverage enhancement level Level 1, the radio frame period for the enhanced transmission of the preamble is 80 radio frames and starting frame locations for the enhanced transmission of the preamble are the 20th frame and the 60th frame. That is, at the coverage enhancement level Level 1, a density of enhanced transmissions of the preamble in 80 frames is 2, and specific transmission opportunities start at the 20th frame and the 60th frame in the 80 frames.

During specific implementation, when configuring the quantity of repetitions for each enhanced transmission of the preamble, the base station may specifically configure the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble. For example, still using a configured time-domain resource at the Level 1 in Table 1 as an example, in Table 1, it can be learnt, by means of query according to all resource indexes configured for the Level 1, that the radio frame number list including the maximum of starting radio frame numbers used to transmit the preamble within each radio frame period is a radio frame number list corresponding to an index 10, where the starting radio frame numbers, used to transmit the preamble, included in the list are successively "0, 5, 10, 15, 20, 25, 30, 35, 40, 45, 50, 55, 60, 65, 70, and 75". It can be known from this item that, two consecutive enhanced transmission opportunities of a preamble are separated by five consecutive radio frames, and in this way, corresponding to the coverage enhancement level Level 1, one enhanced transmission occupies five consecutive radio frames, that is, each enhanced transmission of a preamble performed by the user equipment is repeatedly performed within the five consecutive radio frames.

Alternatively, when configuring the quantity of repetitions for each enhanced transmission of the preamble, the base station specifically configures a starting frame number list used to transmit the preamble within each radio frame period and a quantity of radio frames used to continuously transmit the preamble after each starting frame (the configuration manner differs from the foregoing manner in that the quantity of radio frames used to transmit the preamble after the starting frame numbers is explicitly indicated, instead of being implicitly indicated by using a list), so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index. For example, still using a configured time-domain resource at the Level 1 in Table 1 as an example, in Table 1, starting radio frame numbers that are used to transmit the preamble within each radio frame period and that are corresponding to all resource indexes can be learnt by means of query. For example, starting radio frame numbers corresponding to an index 4 are the 0th frame and the 40th frame. In addition, in this embodiment, 10 frames after the 0th starting radio frame and 10 frames after the 40th starting radio frame may be further directly configured to continuously transmit the preamble. Therefore, corresponding to the coverage enhancement level Level 1, when a resource configuration corresponding to the index 4 is used, a starting frame for one enhanced transmission is the 0th frame, and the enhanced transmission occupies 10 consecutive radio frames, that is, each enhanced transmission of a preamble is repeatedly performed within the 10 consecutive radio frames.

Alternatively, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; for example, still using a configured time-domain resource at the Level 1 in Table 1 as an example, the fifth column in Table 1 is a configured quantity of subframe numbers that are used to transmit the preamble in each radio frame. For example, referring to Table 1, it can be learnt, from the fourth column in Table 1, that when a resource configuration of the index 4 is used for the coverage enhancement level Level 1, starting radio frame numbers used for enhanced transmissions of the preamble are the 0th frame and the 40th frame. The fifth column in Table 1 is further queried, and it may be learnt that there is one subframe number that is used to transmit the preamble in the 0th frame and the 40th frame. Therefore, after the base station delivers the index 4 of the time-domain resource to the user equipment, the user equipment using a resource at the coverage enhancement level Level 1 can learn, by means of query according to the index 4, that the starting radio frame numbers used for the enhanced transmissions of the preamble are the 0th frame and the 40th frame, and that there is one subframe number that is used to transmit the preamble in the 0th frame and the 40th frame. Certainly, during specific implementation, one column may be further added to Table 1 to indicate a subframe number that is used to transmit the preamble in each radio frame, so that the user equipment can learn the subframe number by means of query; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level, where this manner differs from the foregoing manner in that, a subframe number configured for the resource at the non-coverage enhancement level may be directly used without reconfiguring a subframe number that is used for an enhanced transmission of the preamble in each radio frame. For details of resource configuration information of the non-coverage enhancement level, refer to Table 2, where "Subframe number" is a subframe number that may be specifically used for an enhanced transmission of a preamble.

In conclusion, in this embodiment, a transmission quantity, of a preamble, corresponding to one enhanced transmission is finally determined by a configured starting frame number of a radio frame for an enhanced transmission of a preamble, a quantity of radio frames used to continuously transmit the preamble after the starting frame number, and a quantity of subframe numbers that are used to transmit the preamble in each radio frame. For example, when a starting frame number of one radio frame used to transmit a preamble is set to 0, a quantity of radio frames used to continuously transmit the preamble after the starting frame number is set to 5, and a quantity of subframe numbers that are used to transmit the preamble in each radio frame is set to 2, in response to one enhanced transmission at a corresponding coverage enhancement level, a preamble is repeatedly transmitted for 10 times.

Table 1, Table 3, and Table 4 in the following are resource configuration information tables for different coverage enhancement levels in a frequency division duplexing (FDD) system in the embodiments (Table 1 is a resource configuration information table for a coverage enhancement level Level 1, Table 3 is a resource configuration information table for a coverage enhancement level Level 2, and Table 4 is a resource configuration information table for a coverage enhancement level Level 3). A format of a subframe that is used to transmit a preamble in each radio frame may be shown in Table 2 (that is, still using the manner of configuring a resource for a non-coverage enhancement level).

TABLE 1

| Level 1 PRACH configurations for FDD | | | | |
|---|---|---|---|---|
| Level 1 PRACH Configuration Index (Index of a Time-domain Resource at a Coverage Enhancement Level Level 1) | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in radio frame (Quantity of Subframe Numbers Used to Transmit a Preamble in One Radio Frame) |
| 0 | 0 | 80 | 0 | 1 |
| 1 | 0 | 80 | 20 | 1 |
| 2 | 0 | 80 | 40 | 1 |

TABLE 1-continued

Level 1 PRACH configurations for FDD

| Level 1 PRACH Configuration Index (Index of a Time-domain Resource at a Coverage Enhancement Level Level 1 | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in radio frame (Quantity of Subframe Numbers Used to Transmit a Preamble in One Radio Frame) |
|---|---|---|---|---|
| 3 | 0 | 80 | 60 | 1 |
| 4 | 0 | 80 | 0, 40 | 1 |
| 5 | 0 | 80 | 20, 60 | 1 |
| 6 | 0 | 80 | 0, 20, 40, 60 | 1 |
| 7 | 0 | 80 | 10, 30, 50, 70 | 1 |
| 8 | 0 | 80 | 0, 10, 20, 30, 40, 50, 60, 70 | 1 |
| 9 | 0 | 80 | 5, 15, 25, 35, 45, 55, 65, 75 | 1 |
| 10 | 0 | 80 | 0, 5, 10, 15, 20, 25, 30, 35, 40, 45, 50, 55, 60, 65, 70, 75 | 1 |
| 11 | 0 | 80 | 0 | 2 |
| 12 | 0 | 80 | 20 | 2 |
| 13 | 0 | 80 | 40 | 2 |
| 14 | 0 | 80 | 60 | 2 |
| 15 | 0 | 80 | 0, 40 | 2 |
| 16 | 0 | 80 | 20, 60 | 2 |
| 17 | 0 | 80 | 0, 20, 40, 60 | 2 |
| 18 | 0 | 80 | 10, 30, 50, 70 | 2 |
| 19 | 0 | 80 | 0, 10, 20, 30, 40, 50, 60, 70 | 2 |
| 20 | 0 | 80 | 5, 15, 25, 35, 45, 55, 65, 75 | 2 |
| 21 | 0 | 80 | 0, 5, 10, 15, 20, 25, 30, 35, 40, 45, 50, 55, 60, 65, 70, 75 | 2 |
| 22 | 0 | 80 | 0 | 3 |
| 23 | 0 | 80 | 20 | 3 |
| 24 | 0 | 80 | 40 | 3 |
| 25 | 0 | 80 | 60 | 3 |
| 26 | 0 | 80 | 0, 40 | 3 |
| 27 | 0 | 80 | 20, 60 | 3 |
| 28 | 0 | 80 | 0, 20, 40, 60 | 3 |
| 29 | 0 | 80 | 10, 30, 50, 70 | 3 |
| 30 | 0 | 80 | 0, 10, 20, 30, 40, 50, 60, 70 | 3 |
| 31 | 0 | 80 | 5, 15, 25, 35, 45, 55, 65, 75 | 3 |
| 32 | 0 | 80 | 0, 5, 10, 15, 20, 25, 30, 35, 40, 45, 50, 55, 60, 65, 70, 75 | 3 |
| 33 | 0 | 80 | 0 | 5 |
| 34 | 0 | 80 | 20 | 5 |
| 35 | 0 | 80 | 40 | 5 |
| 36 | 0 | 80 | 60 | 5 |
| 37 | 0 | 80 | 0, 40 | 5 |
| 38 | 0 | 80 | 20, 60 | 5 |
| 39 | 0 | 80 | 0, 20, 40, 60 | 5 |
| 40 | 0 | 80 | 10, 30, 50, 70 | 5 |
| 41 | 0 | 80 | 0, 10, 20, 30, 40, 50, 60, 70 | 5 |
| 42 | 0 | 80 | 5, 15, 25, 35, 45, 55, 65, 75 | 5 |
| 43 | 0 | 80 | 0, 5, 10, 15, 20, 25, 30, 35, 40, 45, 50, 55, 60, 65, 70, 75 | 5 |
| 44 | 0 | 80 | 0 | 10 |
| 45 | 0 | 80 | 20 | 10 |
| 46 | 0 | 80 | 40 | 10 |
| 47 | 0 | 80 | 60 | 10 |
| 48 | 0 | 80 | 0, 40 | 10 |
| 49 | 0 | 80 | 20, 60 | 10 |
| 50 | 0 | 80 | 0, 20, 40, 60 | 10 |
| 51 | 0 | 80 | 10, 30, 50, 70 | 10 |
| 52 | 0 | 80 | 0, 10, 20, 30, 40, 50, 60, 70 | 10 |
| 53 | 0 | 80 | 5, 15, 25, 35, 45, 55, 65, 75 | 10 |
| 54 | 0 | 80 | 0, 5, 10, 15, 20, 25, 30, 35, 40, 45, 50, 55, 60, 65, 70, 75 | 10 |
| 55 | 1 | 80 | 0 | 1 |
| 56 | 1 | 80 | 20 | 1 |
| 57 | 1 | 80 | 40 | 1 |
| 58 | 1 | 80 | 60 | 1 |
| 59 | 1 | 80 | 0, 40 | 1 |
| 60 | 1 | 80 | 20, 60 | 1 |
| 61 | 1 | 80 | 0, 20, 40, 60 | 1 |
| 62 | 1 | 80 | 10, 30, 50, 70 | 1 |
| 63 | 1 | 80 | 0, 10, 20, 30, 40, 50, 60, 70 | 1 |
| 64 | 1 | 80 | 5, 15, 25, 35, 45, 55, 65, 75 | 1 |
| 65 | 1 | 80 | 0, 5, 10, 15, 20, 25, 30, 35, 40, 45, 50, 55, 60, 65, 70, 75 | 1 |

TABLE 1-continued

Level 1 PRACH configurations for FDD

| Level 1 PRACH Configuration Index (Index of a Time-domain Resource at a Coverage Enhancement Level Level 1) | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in radio frame (Quantity of Subframe Numbers Used to Transmit a Preamble in One Radio Frame) |
|---|---|---|---|---|
| 66 | 1 | 80 | 0 | 2 |
| 67 | 1 | 80 | 20 | 2 |
| 68 | 1 | 80 | 40 | 2 |
| 69 | 1 | 80 | 60 | 2 |
| 70 | 1 | 80 | 0, 40 | 2 |
| 71 | 1 | 80 | 20, 60 | 2 |
| 72 | 1 | 80 | 0, 20, 40, 60 | 2 |
| 73 | 1 | 80 | 10, 30, 50, 70 | 2 |
| 74 | 1 | 80 | 0, 10, 20, 30, 40, 50, 60, 70 | 2 |
| 75 | 1 | 80 | 5, 15, 25, 35, 45, 55, 65, 75 | 2 |
| 76 | 1 | 80 | 0, 5, 10, 15, 20, 25, 30, 35, 40, 45, 50, 55, 60, 65, 70, 75 | 2 |
| 77 | 1 | 80 | 0 | 3 |
| 78 | 1 | 80 | 20 | 3 |
| 79 | 1 | 80 | 40 | 3 |
| 80 | 1 | 80 | 60 | 3 |
| 81 | 1 | 80 | 0, 40 | 3 |
| 82 | 1 | 80 | 20, 60 | 3 |
| 83 | 1 | 80 | 0, 20, 40, 60 | 3 |
| 84 | 1 | 80 | 10, 30, 50, 70 | 3 |
| 85 | 1 | 80 | 0, 10, 20, 30, 40, 50, 60, 70 | 3 |
| 86 | 1 | 80 | 5, 15, 25, 35, 45, 55, 65, 75 | 3 |
| 87 | 1 | 80 | 0, 5, 10, 15, 20, 25, 30, 35, 40, 45, 50, 55, 60, 65, 70, 75 | 3 |
| 88 | 1 | 80 | 0 | 5 |
| 89 | 1 | 80 | 20 | 5 |
| 90 | 1 | 80 | 40 | 5 |
| 91 | 1 | 80 | 60 | 5 |
| 92 | 1 | 80 | 0, 40 | 5 |
| 93 | 1 | 80 | 20, 60 | 5 |
| 94 | 1 | 80 | 0, 20, 40, 60 | 5 |
| 95 | 1 | 80 | 10, 30, 50, 70 | 5 |
| 96 | 1 | 80 | 0, 10, 20, 30, 40, 50, 60, 70 | 5 |
| 97 | 1 | 80 | 5, 15, 25, 35, 45, 55, 65, 75 | 5 |
| 98 | 1 | 80 | 0, 5, 10, 15, 20, 25, 30, 35, 40, 45, 50, 55, 60, 65, 70, 75 | 5 |
| 99 | 1 | 80 | 0 | 10 |
| 100 | 1 | 80 | 20 | 10 |
| 101 | 1 | 80 | 40 | 10 |
| 102 | 1 | 80 | 60 | 10 |
| 103 | 1 | 80 | 0, 40 | 10 |
| 104 | 1 | 80 | 20, 60 | 10 |
| 105 | 1 | 80 | 0, 20, 40, 60 | 10 |
| 106 | 1 | 80 | 10, 30, 50, 70 | 10 |
| 107 | 1 | 80 | 0, 10, 20, 30, 40, 50, 60, 70 | 10 |
| 108 | 1 | 80 | 5, 15, 25, 35, 45, 55, 65, 75 | 10 |
| 109 | 1 | 80 | 0, 5, 10, 15, 20, 25, 30, 35, 40, 45, 50, 55, 60, 65, 70, 75 | 10 |
| 110 | 2 | 80 | 0 | 1 |
| 111 | 2 | 80 | 20 | 1 |
| 112 | 2 | 80 | 40 | 1 |
| 113 | 2 | 80 | 60 | 1 |
| 114 | 2 | 80 | 0, 40 | 1 |
| 115 | 2 | 80 | 20, 60 | 1 |
| 116 | 2 | 80 | 0, 20, 40, 60 | 1 |
| 117 | 2 | 80 | 10, 30, 50, 70 | 1 |
| 118 | 2 | 80 | 0, 10, 20, 30, 40, 50, 60, 70 | 1 |
| 119 | 2 | 80 | 5, 15, 25, 35, 45, 55, 65, 75 | 1 |
| 120 | 2 | 80 | 0, 5, 10, 15, 20, 25, 30, 35, 40, 45, 50, 55, 60, 65, 70, 75 | 1 |
| 121 | 2 | 80 | 0 | 2 |
| 122 | 2 | 80 | 20 | 2 |
| 123 | 2 | 80 | 40 | 2 |
| 124 | 2 | 80 | 60 | 2 |
| 125 | 2 | 80 | 0, 40 | 2 |
| 126 | 2 | 80 | 20, 60 | 2 |
| 127 | 2 | 80 | 0, 20, 40, 60 | 2 |
| 128 | 2 | 80 | 10, 30, 50, 70 | 2 |
| 129 | 2 | 80 | 0, 10, 20, 30, 40, 50, 60, 70 | 2 |

TABLE 1-continued

Level 1 PRACH configurations for FDD

| Level 1 PRACH Configuration Index (Index of a Time-domain Resource at a Coverage Enhancement Level Level 1 | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in radio frame (Quantity of Subframe Numbers Used to Transmit a Preamble in One Radio Frame) |
|---|---|---|---|---|
| 130 | 2 | 80 | 5, 15, 25, 35, 45, 55, 65, 75 | 2 |
| 131 | 2 | 80 | 0, 5, 10, 15, 20, 25, 30, 35, 40, 45, 50, 55, 60, 65, 70, 75 | 2 |
| 132 | 2 | 80 | 0 | 3 |
| 133 | 2 | 80 | 20 | 3 |
| 134 | 2 | 80 | 40 | 3 |
| 135 | 2 | 80 | 60 | 3 |
| 136 | 2 | 80 | 0, 40 | 3 |
| 137 | 2 | 80 | 20, 60 | 3 |
| 138 | 2 | 80 | 0, 20, 40, 60 | 3 |
| 139 | 2 | 80 | 10, 30, 50, 70 | 3 |
| 140 | 2 | 80 | 0, 10, 20, 30, 40, 50, 60, 70 | 3 |
| 141 | 2 | 80 | 5, 15, 25, 35, 45, 55, 65, 75 | 3 |
| 142 | 2 | 80 | 0, 5, 10, 15, 20, 25, 30, 35, 40, 45, 50, 55, 60, 65, 70, 75 | 3 |
| 143 | 2 | 80 | 0 | 5 |
| 144 | 2 | 80 | 20 | 5 |
| 145 | 2 | 80 | 40 | 5 |
| 146 | 2 | 80 | 60 | 5 |
| 147 | 2 | 80 | 0, 40 | 5 |
| 148 | 2 | 80 | 20, 60 | 5 |
| 149 | 2 | 80 | 0, 20, 40, 60 | 5 |
| 150 | 2 | 80 | 10, 30, 50, 70 | 5 |
| 151 | 2 | 80 | 0, 10, 20, 30, 40, 50, 60, 70 | 5 |
| 152 | 2 | 80 | 5, 15, 25, 35, 45, 55, 65, 75 | 5 |
| 153 | 2 | 80 | 0, 5, 10, 15, 20, 25, 30, 35, 40, 45, 50, 55, 60, 65, 70, 75 | 5 |
| 154 | 2 | 80 | 0 | 10 |
| 155 | 2 | 80 | 20 | 10 |
| 156 | 2 | 80 | 40 | 10 |
| 157 | 2 | 80 | 60 | 10 |
| 158 | 2 | 80 | 0, 40 | 10 |
| 159 | 2 | 80 | 20, 60 | 10 |
| 160 | 2 | 80 | 0, 20, 40, 60 | 10 |
| 161 | 2 | 80 | 10, 30, 50, 70 | 10 |
| 162 | 2 | 80 | 0, 10, 20, 30, 40, 50, 60, 70 | 10 |
| 163 | 2 | 80 | 5, 15, 25, 35, 45, 55, 65, 75 | 10 |
| 164 | 2 | 80 | 0, 5, 10, 15, 20, 25, 30, 35, 40, 45, 50, 55, 60, 65, 70, 75 | 10 |
| 165 | 3 | 80 | 0 | 1 |
| 166 | 3 | 80 | 20 | 1 |
| 167 | 3 | 80 | 40 | 1 |
| 168 | 3 | 80 | 60 | 1 |
| 169 | 3 | 80 | 0, 40 | 1 |
| 170 | 3 | 80 | 20, 60 | 1 |
| 171 | 3 | 80 | 0, 20, 40, 60 | 1 |
| 172 | 3 | 80 | 10, 30, 50, 70 | 1 |
| 173 | 3 | 80 | 0, 10, 20, 30, 40, 50, 60, 70 | 1 |
| 174 | 3 | 80 | 5, 15, 25, 35, 45, 55, 65, 75 | 1 |
| 175 | 3 | 80 | 0, 5, 10, 15, 20, 25, 30, 35, 40, 45, 50, 55, 60, 65, 70, 75 | 1 |
| 176 | 3 | 80 | 0 | 2 |
| 177 | 3 | 80 | 20 | 2 |
| 178 | 3 | 80 | 40 | 2 |
| 179 | 3 | 80 | 60 | 2 |
| 180 | 3 | 80 | 0, 40 | 2 |
| 181 | 3 | 80 | 20, 60 | 2 |
| 182 | 3 | 80 | 0, 20, 40, 60 | 2 |
| 183 | 3 | 80 | 10, 30, 50, 70 | 2 |
| 184 | 3 | 80 | 0, 10, 20, 30, 40, 50, 60, 70 | 2 |
| 185 | 3 | 80 | 5, 15, 25, 35, 45, 55, 65, 75 | 2 |
| 186 | 3 | 80 | 0, 5, 10, 15, 20, 25, 30, 35, 40, 45, 50, 55, 60, 65, 70, 75 | 2 |
| 187 | 3 | 80 | 0 | 3 |
| 188 | 3 | 80 | 20 | 3 |
| 189 | 3 | 80 | 40 | 3 |
| 190 | 3 | 80 | 60 | 3 |
| 191 | 3 | 80 | 0, 40 | 3 |
| 192 | 3 | 80 | 20, 60 | 3 |

TABLE 1-continued

Level 1 PRACH configurations for FDD

| Level 1 PRACH Configuration Index (Index of a Time-domain Resource at a Coverage Enhancement Level Level 1 | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in radio frame (Quantity of Subframe Numbers Used to Transmit a Preamble in One Radio Frame) |
|---|---|---|---|---|
| 193 | 3 | 80 | 0, 20, 40, 60 | 3 |
| 194 | 3 | 80 | 10, 30, 50, 70 | 3 |
| 195 | 3 | 80 | 0, 10, 20, 30, 40, 50, 60, 70 | 3 |
| 196 | 3 | 80 | 5, 15, 25, 35, 45, 55, 65, 75 | 3 |
| 197 | 3 | 80 | 0, 5, 10, 15, 20, 25, 30, 35, 40, 45, 50, 55, 60, 65, 70, 75 | 3 |
| 198 | 3 | 80 | 0 | 5 |
| 199 | 3 | 80 | 20 | 5 |
| 200 | 3 | 80 | 40 | 5 |
| 201 | 3 | 80 | 60 | 5 |
| 202 | 3 | 80 | 0, 40 | 5 |
| 203 | 3 | 80 | 20, 60 | 5 |
| 204 | 3 | 80 | 0, 20, 40, 60 | 5 |
| 205 | 3 | 80 | 10, 30, 50, 70 | 5 |
| 206 | 3 | 80 | 0, 10, 20, 30, 40, 50, 60, 70 | 5 |
| 207 | 3 | 80 | 5, 15, 25, 35, 45, 55, 65, 75 | 5 |
| 208 | 3 | 80 | 0, 5, 10, 15, 20, 25, 30, 35, 40, 45, 50, 55, 60, 65, 70, 75 | 5 |
| 209 | 3 | 80 | 0 | 10 |
| 210 | 3 | 80 | 20 | 10 |
| 211 | 3 | 80 | 40 | 10 |
| 212 | 3 | 80 | 60 | 10 |
| 213 | 3 | 80 | 0, 40 | 10 |
| 214 | 3 | 80 | 20, 60 | 10 |
| 215 | 3 | 80 | 0, 20, 40, 60 | 10 |
| 216 | 3 | 80 | 10, 30, 50, 70 | 10 |
| 217 | 3 | 80 | 0, 10, 20, 30, 40, 50, 60, 70 | 10 |
| 218 | 3 | 80 | 5, 15, 25, 35, 45, 55, 65, 75 | 10 |
| 219 | 3 | 80 | 0, 5, 10, 15, 20, 25, 30, 35, 40, 45, 50, 55, 60, 65, 70, 75 | 10 |

TABLE 2

Random access configurations for random preamble formats 0 to 3 in an FDD system

| PRACH Configuration Index of a Time-domain Resource | Preamble Format (Preamble Format) | System Frame Number (System Frame Number) | Subframe Number (Subframe Number) | PRACH Configuration Index (Index of a Time-domain Resource) | Preamble Format (Preamble Format) | System Frame Number (System Frame Number) | Subframe Number (Subframe Number) |
|---|---|---|---|---|---|---|---|
| 0 | 0 | Even | 1 | 32 | 2 | Even | 1 |
| 1 | 0 | Even | 4 | 33 | 2 | Even | 4 |
| 2 | 0 | Even | 7 | 34 | 2 | Even | 7 |
| 3 | 0 | Any | 1 | 35 | 2 | Any | 1 |
| 4 | 0 | Any | 4 | 36 | 2 | Any | 4 |
| 5 | 0 | Any | 7 | 37 | 2 | Any | 7 |
| 6 | 0 | Any | 1, 6 | 38 | 2 | Any | 1, 6 |
| 7 | 0 | Any | 2, 7 | 39 | 2 | Any | 2, 7 |
| 8 | 0 | Any | 3, 8 | 40 | 2 | Any | 3, 8 |
| 9 | 0 | Any | 1, 4, 7 | 41 | 2 | Any | 1, 4, 7 |
| 10 | 0 | Any | 2, 5, 8 | 42 | 2 | Any | 2, 5, 8 |
| 11 | 0 | Any | 3, 6, 9 | 43 | 2 | Any | 3, 6, 9 |
| 12 | 0 | Any | 0, 2, 4, 6, 8 | 44 | 2 | Any | 0, 2, 4, 6, 8 |
| 13 | 0 | Any | 1, 3, 5, 7, 9 | 45 | 2 | Any | 1, 3, 5, 7, 9 |
| 14 | 0 | Any | 0, 1, 2, 3, 4, 5, 6, 7, 8, 9 | 46 | N/A | N/A | N/A |
| 15 | 0 | Even | 9 | 47 | 2 | Even | 9 |
| 16 | 1 | Even | 1 | 48 | 3 | Even | 1 |
| 17 | 1 | Even | 4 | 49 | 3 | Even | 4 |

TABLE 2-continued

Random access configurations for random preamble formats 0 to 3 in an FDD system

| PRACH Configuration Index of a Time-domain Resource | Preamble Format (Preamble Format) | System Frame Number (System Frame Number) | Subframe Number (Subframe Number) | PRACH Configuration Index (Index of a Time-domain Resource) | Preamble Format (Preamble Format) | System Frame Number (System Frame Number) | Subframe Number (Subframe Number) |
|---|---|---|---|---|---|---|---|
| 18 | 1 | Even | 7 | 50 | 3 | Even | 7 |
| 19 | 1 | Any | 1 | 51 | 3 | Any | 1 |
| 20 | 1 | Any | 4 | 52 | 3 | Any | 4 |
| 21 | 1 | Any | 7 | 53 | 3 | Any | 7 |
| 22 | 1 | Any | 1, 6 | 54 | 3 | Any | 1, 6 |
| 23 | 1 | Any | 2, 7 | 55 | 3 | Any | 2, 7 |
| 24 | 1 | Any | 3, 8 | 56 | 3 | Any | 3, 8 |
| 25 | 1 | Any | 1, 4, 7 | 57 | 3 | Any | 1, 4, 7 |
| 26 | 1 | Any | 2, 5, 8 | 58 | 3 | Any | 2, 5, 8 |
| 27 | 1 | Any | 3, 6, 9 | 59 | 3 | Any | 3, 6, 9 |
| 28 | 1 | Any | 0, 2, 4, 6, 8 | 60 | N/A | N/A | N/A |
| 29 | 1 | Any | 1, 3, 5, 7, 9 | 61 | N/A | N/A | N/A |
| 30 | N/A | N/A | N/A | 62 | N/A | N/A | N/A |
| 31 | 1 | Even | 9 | 63 | 3 | Even | 9 |

TABLE 3

Level 2 PRACH configurations for FDD

| Level 2 PRACH Configuration Index (Index of a Time-domain Resource at a Coverage Enhancement Level Level 2 | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in Radio Frame (Quantity of Subframe Numbers Used to Transmit a Preamble in One Radio Frame) |
|---|---|---|---|---|
| 0 | 0 | 80 | 0 | 1 |
| 1 | 0 | 80 | 20 | 1 |
| 2 | 0 | 80 | 40 | 1 |
| 3 | 0 | 80 | 60 | 1 |
| 4 | 0 | 80 | 0, 40 | 1 |
| 5 | 0 | 80 | 20, 60 | 1 |
| 6 | 0 | 80 | 0, 20, 40, 60 | 1 |
| 7 | 0 | 80 | 0 | 2 |
| 8 | 0 | 80 | 20 | 2 |
| 9 | 0 | 80 | 40 | 2 |
| 10 | 0 | 80 | 60 | 2 |
| 11 | 0 | 80 | 0, 40 | 2 |
| 12 | 0 | 80 | 20, 60 | 2 |
| 13 | 0 | 80 | 0, 20, 40, 60 | 2 |
| 14 | 0 | 80 | 0 | 3 |
| 15 | 0 | 80 | 20 | 3 |
| 16 | 0 | 80 | 40 | 3 |
| 17 | 0 | 80 | 60 | 3 |
| 18 | 0 | 80 | 0, 40 | 3 |
| 19 | 0 | 80 | 20, 60 | 3 |
| 20 | 0 | 80 | 0, 20, 40, 60 | 3 |
| 21 | 0 | 80 | 0 | 5 |
| 22 | 0 | 80 | 20 | 5 |
| 23 | 0 | 80 | 40 | 5 |
| 24 | 0 | 80 | 60 | 5 |
| 25 | 0 | 80 | 0, 40 | 5 |
| 26 | 0 | 80 | 20, 60 | 5 |
| 27 | 0 | 80 | 0, 20, 40, 60 | 5 |
| 28 | 0 | 80 | 0 | 10 |
| 29 | 0 | 80 | 20 | 10 |
| 30 | 0 | 80 | 40 | 10 |
| 31 | 0 | 80 | 60 | 10 |
| 32 | 0 | 80 | 0, 40 | 10 |
| 33 | 0 | 80 | 20, 60 | 10 |
| 34 | 0 | 80 | 0, 20, 40, 60 | 10 |
| 35 | 1 | 80 | 0 | 1 |
| 36 | 1 | 80 | 20 | 1 |

TABLE 3-continued

Level 2 PRACH configurations for FDD

| Level 2 PRACH Configuration Index (Index of a Time-domain Resource at a Coverage Enhancement Level Level 2 | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in Radio Frame (Quantity of Subframe Numbers Used to Transmit a Preamble in One Radio Frame) |
|---|---|---|---|---|
| 37 | 1 | 80 | 40 | 1 |
| 38 | 1 | 80 | 60 | 1 |
| 39 | 1 | 80 | 0, 40 | 1 |
| 40 | 1 | 80 | 20, 60 | 1 |
| 41 | 1 | 80 | 0, 20, 40, 60 | 1 |
| 42 | 1 | 80 | 0 | 2 |
| 43 | 1 | 80 | 20 | 2 |
| 44 | 1 | 80 | 40 | 2 |
| 45 | 1 | 80 | 60 | 2 |
| 46 | 1 | 80 | 0, 40 | 2 |
| 47 | 1 | 80 | 20, 60 | 2 |
| 48 | 1 | 80 | 0, 20, 40, 60 | 2 |
| 49 | 1 | 80 | 0 | 3 |
| 50 | 1 | 80 | 20 | 3 |
| 51 | 1 | 80 | 40 | 3 |
| 52 | 1 | 80 | 60 | 3 |
| 53 | 1 | 80 | 0, 40 | 3 |
| 54 | 1 | 80 | 20, 60 | 3 |
| 55 | 1 | 80 | 0, 20, 40, 60 | 3 |
| 56 | 1 | 80 | 0 | 5 |
| 57 | 1 | 80 | 20 | 5 |
| 58 | 1 | 80 | 40 | 5 |
| 59 | 1 | 80 | 60 | 5 |
| 60 | 1 | 80 | 0, 40 | 5 |
| 61 | 1 | 80 | 20, 60 | 5 |
| 62 | 1 | 80 | 0, 20, 40, 60 | 5 |
| 63 | 1 | 80 | 0 | 10 |
| 64 | 1 | 80 | 20 | 10 |
| 65 | 1 | 80 | 40 | 10 |
| 66 | 1 | 80 | 60 | 10 |
| 67 | 1 | 80 | 0, 40 | 10 |
| 68 | 1 | 80 | 20, 60 | 10 |
| 69 | 1 | 80 | 0, 20, 40, 60 | 10 |
| 70 | 2 | 80 | 0 | 1 |
| 71 | 2 | 80 | 20 | 1 |
| 72 | 2 | 80 | 40 | 1 |
| 73 | 2 | 80 | 60 | 1 |
| 74 | 2 | 80 | 0, 40 | 1 |
| 75 | 2 | 80 | 20, 60 | 1 |
| 76 | 2 | 80 | 0, 20, 40, 60 | 1 |
| 77 | 2 | 80 | 0 | 2 |
| 78 | 2 | 80 | 20 | 2 |
| 79 | 2 | 80 | 40 | 2 |
| 80 | 2 | 80 | 60 | 2 |
| 81 | 2 | 80 | 0, 40 | 2 |
| 82 | 2 | 80 | 20, 60 | 2 |
| 83 | 2 | 80 | 0, 20, 40, 60 | 2 |
| 84 | 2 | 80 | 0 | 3 |
| 85 | 2 | 80 | 20 | 3 |
| 86 | 2 | 80 | 40 | 3 |
| 87 | 2 | 80 | 60 | 3 |
| 88 | 2 | 80 | 0, 40 | 3 |
| 89 | 2 | 80 | 20, 60 | 3 |
| 90 | 2 | 80 | 0, 20, 40, 60 | 3 |
| 91 | 2 | 80 | 0 | 5 |
| 92 | 2 | 80 | 20 | 5 |
| 93 | 2 | 80 | 40 | 5 |
| 94 | 2 | 80 | 60 | 5 |
| 95 | 2 | 80 | 0, 40 | 5 |
| 96 | 2 | 80 | 20, 60 | 5 |
| 97 | 2 | 80 | 0, 20, 40, 60 | 5 |
| 98 | 2 | 80 | 0 | 10 |
| 99 | 2 | 80 | 20 | 10 |
| 100 | 2 | 80 | 40 | 10 |
| 101 | 2 | 80 | 60 | 10 |
| 102 | 2 | 80 | 0, 40 | 10 |
| 103 | 2 | 80 | 20, 60 | 10 |
| 104 | 2 | 80 | 0, 20, 40, 60 | 10 |
| 105 | 3 | 80 | 0 | 1 |

TABLE 3-continued

Level 2 PRACH configurations for FDD

| Level 2 PRACH Configuration Index (Index of a Time-domain Resource at a Coverage Enhancement Level Level 2) | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in Radio Frame (Quantity of Subframe Numbers Used to Transmit a Preamble in One Radio Frame) |
|---|---|---|---|---|
| 106 | 3 | 80 | 20 | 1 |
| 107 | 3 | 80 | 40 | 1 |
| 108 | 3 | 80 | 60 | 1 |
| 109 | 3 | 80 | 0, 40 | 1 |
| 110 | 3 | 80 | 20, 60 | 1 |
| 111 | 3 | 80 | 0, 20, 40, 60 | 1 |
| 112 | 3 | 80 | 0 | 2 |
| 113 | 3 | 80 | 20 | 2 |
| 114 | 3 | 80 | 40 | 2 |
| 115 | 3 | 80 | 60 | 2 |
| 116 | 3 | 80 | 0, 40 | 2 |
| 117 | 3 | 80 | 20, 60 | 2 |
| 118 | 3 | 80 | 0, 20, 40, 60 | 2 |
| 119 | 3 | 80 | 0 | 3 |
| 120 | 3 | 80 | 20 | 3 |
| 121 | 3 | 80 | 40 | 3 |
| 122 | 3 | 80 | 60 | 3 |
| 123 | 3 | 80 | 0, 40 | 3 |
| 124 | 3 | 80 | 20, 60 | 3 |
| 125 | 3 | 80 | 0, 20, 40, 60 | 3 |
| 126 | 3 | 80 | 0 | 5 |
| 127 | 3 | 80 | 20 | 5 |
| 128 | 3 | 80 | 40 | 5 |
| 129 | 3 | 80 | 60 | 5 |
| 130 | 3 | 80 | 0, 40 | 5 |
| 131 | 3 | 80 | 20, 60 | 5 |
| 132 | 3 | 80 | 0, 20, 40, 60 | 5 |
| 133 | 3 | 80 | 0 | 10 |
| 134 | 3 | 80 | 20 | 10 |
| 135 | 3 | 80 | 40 | 10 |
| 136 | 3 | 80 | 60 | 10 |
| 137 | 3 | 80 | 0, 40 | 10 |
| 138 | 3 | 80 | 20, 60 | 10 |
| 139 | 3 | 80 | 0, 20, 40, 60 | 10 |

TABLE 4

Level 3 PRACH configurations for FDD

| Level 3 PRACH Configuration Index (Index of a Time-domain Resource at a Coverage Enhancement Level level 3) | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in Radio Frame (Quantity of Subframe Numbers Used to Transmit a Preamble in One Radio Frame) |
|---|---|---|---|---|
| 0 | 0 | 80 | 0 | 1 |
| 1 | 0 | 80 | 40 | 1 |
| 2 | 0 | 80 | 0, 40 | 1 |
| 3 | 0 | 80 | 0 | 2 |
| 4 | 0 | 80 | 40 | 2 |
| 5 | 0 | 80 | 0, 40 | 2 |
| 6 | 0 | 80 | 0 | 3 |
| 7 | 0 | 80 | 40 | 3 |
| 8 | 0 | 80 | 0, 40 | 3 |
| 9 | 0 | 80 | 0 | 5 |
| 10 | 0 | 80 | 40 | 5 |
| 11 | 0 | 80 | 0, 40 | 5 |
| 12 | 0 | 80 | 0 | 10 |
| 13 | 0 | 80 | 40 | 10 |
| 14 | 0 | 80 | 0, 40 | 10 |
| 15 | 1 | 80 | 0 | 1 |
| 16 | 1 | 80 | 40 | 1 |
| 17 | 1 | 80 | 0, 40 | 1 |

TABLE 4-continued

Level 3 PRACH configurations for FDD

| Level 3 PRACH Configuration Index (Index of a Time-domain Resource at a Coverage Enhancement Level level 3) | Preamble Format (Preamble Format) | Periodicity (Number of Frames) (Transmission Period) | Version SFN Mod Periodicity (Resource Version, Starting Radio Frames for Transmitting a Preamble Within Each Period) | Subframes in Radio Frame (Quantity of Subframe Numbers Used to Transmit a Preamble in One Radio Frame) |
|---|---|---|---|---|
| 18 | 1 | 80 | 0 | 2 |
| 19 | 1 | 80 | 40 | 2 |
| 20 | 1 | 80 | 0, 40 | 2 |
| 21 | 1 | 80 | 0 | 3 |
| 22 | 1 | 80 | 40 | 3 |
| 23 | 1 | 80 | 0, 40 | 3 |
| 24 | 1 | 80 | 0 | 5 |
| 25 | 1 | 80 | 40 | 5 |
| 26 | 1 | 80 | 0, 40 | 5 |
| 27 | 1 | 80 | 0 | 10 |
| 28 | 1 | 80 | 40 | 10 |
| 29 | 1 | 80 | 0, 40 | 10 |
| 30 | 2 | 80 | 0 | 1 |
| 31 | 2 | 80 | 40 | 1 |
| 32 | 2 | 80 | 0, 40 | 1 |
| 33 | 2 | 80 | 0 | 2 |
| 34 | 2 | 80 | 40 | 2 |
| 35 | 2 | 80 | 0, 40 | 2 |
| 36 | 2 | 80 | 0 | 3 |
| 37 | 2 | 80 | 40 | 3 |
| 38 | 2 | 80 | 0, 40 | 3 |
| 39 | 2 | 80 | 0 | 5 |
| 40 | 2 | 80 | 40 | 5 |
| 41 | 2 | 80 | 0, 40 | 5 |
| 42 | 2 | 80 | 0 | 10 |
| 43 | 2 | 80 | 40 | 10 |
| 44 | 2 | 80 | 0, 40 | 10 |
| 45 | 3 | 80 | 0 | 1 |
| 46 | 3 | 80 | 40 | 1 |
| 47 | 3 | 80 | 0, 40 | 1 |
| 48 | 3 | 80 | 0 | 2 |
| 49 | 3 | 80 | 40 | 2 |
| 50 | 3 | 80 | 0, 40 | 2 |
| 51 | 3 | 80 | 0 | 3 |
| 52 | 3 | 80 | 40 | 3 |
| 53 | 3 | 80 | 0, 40 | 3 |
| 54 | 3 | 80 | 0 | 5 |
| 55 | 3 | 80 | 40 | 5 |
| 56 | 3 | 80 | 0, 40 | 5 |
| 57 | 3 | 80 | 0 | 10 |
| 58 | 3 | 80 | 40 | 10 |
| 59 | 3 | 80 | 0, 40 | 10 |

It can be learnt from Table 1 to Table 4 that indexes configured for resources at different coverage enhancement levels are provided for different tables separately. During specific implementation, the base station may configure different indexes for user equipments at three different coverage enhancement levels in three different tables, to indicate resource configurations for the different coverage enhancement levels. For example, a resource, for a non-enhanced transmission of a preamble, configured for a common user by the base station is indexed according to Table 2, where a subframe number that is used to transmit a preamble in each radio frame is included. Resources, configured for a user that needs to use a coverage enhancement resource, for enhanced transmissions of a preamble are indexed according to indexes in Table 1, Table 3, and Table 4. A quantity of subframe numbers includes a quantity of subframe numbers that are used to transmit a preamble in each radio frame. That which specific subframe number or subframe numbers are used is determined by an index that is configured, by an eNB for a user that uses a resource at a non-coverage enhancement level, to transmit a preamble, that is, determined according to Table 2. Alternatively, resources, configured for different coverage enhancement levels, for enhanced transmissions of a preamble may be indexed according to one table, namely Table 1, but resources corresponding to different indexes are used during the configuration. For example, when the eNB sets an index value of a time-domain resource at the coverage enhancement level 1 to 4, UE can learn the following by querying the table: a used random preamble format is 0; a location for an enhanced transmission opportunity calculated by using 80 radio frames as a period is that a system frame number (SFN) 0 or 40 is used as a starting location in a radio frame, where the result is obtained after a modulus operation is performed on 80; and one radio frame includes one subframe number. That which specific subframe number is used is determined by an index that is configured, by the eNB for a user that uses a resource at a non-coverage enhancement level, to transmit a preamble. For example, if the index is 5, a random preamble is transmitted by using a subframe whose subframe number in a radio frame is 5 as a starting point. However, in the current Table 1, there is no information about a quantity of radio frames that are used to continuously and repeatedly transmit a preamble after the starting frame. As described above, in this embodiment, the information may be obtained by adding, to Table 1, a column used to present the quantity of radio frames that are used to continuously and repeatedly transmit a preamble after the starting frame, or may be separately carried directly in a system message, or may be determined by a quantity of radio frames between every two starting frames in a starting frame list including a maximum of starting frames in Table 1. Herein, it may be assumed that in the foregoing three manners, the configured quantity of radio frames that are used to continuously and repeatedly transmit a preamble after the starting frame is 5.

During specific implementation, in step S110, the PRACH resource configured by the base station may include a frequency-domain resource, configuration information of the frequency-domain resource includes a frequency offset value (frequency offset), and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station. During specific implementation, the base station configures a same frequency offset value for different coverage enhancement levels, to indicate a same offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the base station configures multiple different frequency offset values, where each frequency offset value is used to indicate a frequency offset of a starting location, with respect to the starting location of the carrier frequency band, for an enhanced transmission of a preamble at a coverage enhancement level; in this way, when receiving a frequency offset value configured for each coverage enhancement level by the base station, the user equipment uses the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

During specific implementation, when the PRACH resource configured by the base station includes the frequency-domain resource, the base station may transmit, to the user equipment, the frequency offset value configured for each coverage enhancement level.

During specific implementation, with reference to configurations in Table 1 to Table 4, the base station (for example, an eNB) may transmit, in a system information block (SIB), an index configured for the time-domain resource corresponding to the supported coverage enhancement level. In addition, the base station may further transmit, in the SIB, a frequency offset value of the frequency-domain resource corresponding to the supported coverage enhancement level. For the two resource configurations, the configurations in the SIB may be as shown in code segment 1:

```
code segment 1:
rootSequenceIndex                  INTEGER (0..837),
prach-ConfigIndex                  INTEGER (0..63),
prach_Level 1_ConfigIndex          INTEGER (0..219)
prach_Level 2_ConfigIndex          INTEGER (0..139),
prach_Level 3_ConfigIndex          INTEGER (0..59),
          highSpeedFlag                      BOOLEAN,
          zeroCorrelationZoneConfig          INTEGER (0..15),
          prach-FreqOffset                   INTEGER (0..94),
prach_Level 1_FreqOffset           INTEGER (0..94),
prach_Level 2_FreqOffset           INTEGER (0..94),
prach_Level 3_FreqOffset           INTEGER (0..94).
``` ported by the base station; in this way, when receiving the same frequency offset value configured for the different coverage enhancement levels by the base station, the user equipment uses the same frequency offset value as the offset of the starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the base station configures a same frequency offset value for different coverage enhancement levels, to indicate same frequency separation between each coverage enhancement level and a previous adjacent coverage enhancement level; in this way, when receiving the same frequency offset value configured for the different coverage enhancement levels by the base station, the user equipment uses the same frequency offset value as frequency separation between starting locations for the enhanced transmissions of the preambles at all the coverage enhancement levels sup- In the foregoing configuration information, existence of resource configurations for which coverage enhancement levels Level indicates that the base station supports the corresponding coverage enhancement levels, where information segments of:

```
prach_Level 1_ConfigIndex    INTEGER (0..219),
prach_Level 2_ConfigIndex    INTEGER (0..139), and
prach_Level 3_ConfigIndex    INTEGER (0..59)
``` represent delivery of index information of time-domain resources, what are carried in INTEGER (0 . . . 219) are all resource indexes configured for the Level 1 by the base station in Table 1, what are carried in INTEGER (0 . . . 139) are all resource indexes configured for the Level 2 by the base station in Table 3, and what are carried in INTEGER (0 . . . 59) are all resource indexes configured for the Level 3 by the base station in Table 4. In this way, after receiving these indexes, the user equipment can obtain, by querying Table 1, a PRACH resource configured for the Level 1, obtain, by querying Table 3, a PRACH resource configured for the Level 2, and obtain, by querying Table 4, a PRACH resource configured for the Level 3.

However, information segments of:

| | |
|---|---|
| prach_Level 1_FreqOffset | INTEGER (0..94), |
| prach_Level 2_FreqOffset | INTEGER (0..94), and |
| prach_Level 3_FreqOffset | INTEGER (0..94) | represent delivery of offset values of frequency-domain resources; and what is carried in prach_Level 1_FreqOffset INTEGER (0 . . . 94) is an offset of a frequency at the Level 1 with respect to the smallest carrier frequency, what is carried in prach_Level 2_FreqOffset INTEGER (0 . . . 94) is an offset of a frequency at the Level 2 with respect to the smallest carrier frequency, and what is carried in prach_Level 3_FreqOffset INTEGER (0 . . . 94) is an offset of a frequency at the Level 3 with respect to the smallest carrier frequency. For the FDD system, the smallest carrier frequency corresponds to a first physical resource block for a PRACH transmission opportunity, where the value is greater than or equal to 0, or less than or equal to a quantity of uplink carrier resource blocks minus 6.

During specific implementation, when frequency-domain resource locations configured for a coverage enhancement level and a non-coverage enhancement level by the base station are the same, that is, a frequency-domain offset corresponding to the coverage enhancement level is the same as a prach-FreqOffset value, and when time-domain resources configured for the coverage enhancement level and the non-coverage enhancement level by the base station overlap partially, the base station may configure, for the coverage enhancement level, a codeword resource different from that configured for the non-coverage enhancement level. For user equipment that uses a configuration of a resource transmitted in a non-coverage enhancement way, a preamble configuration includes a total quantity of preambles configured in a cell. These preambles are classified into two groups, namely a group A and a group B. The user equipment that uses the configuration of the resource transmitted in the non-coverage enhancement way determines to use a codeword in the group A or the group B according to a size of transmitted message 3. The configuration includes a quantity of preamble codewords in the group A, and a quantity of codewords corresponding to the group B may be implicitly obtained by the total quantity of preambles configured in the cell minus the quantity of preamble codewords in the group A in the configuration.

In this embodiment, the codeword resource configured for the coverage enhancement level by the base station includes at least one of the following configured for each coverage enhancement level: a total quantity of preambles, a quantity of preambles corresponding to the group A, or a root sequence. During specific implementation, the root sequence configured for each coverage enhancement level by the base station may be the same as a root sequence of a resource transmitted in a non-coverage enhancement way, but the total quantity of preambles configured for each coverage enhancement level and the quantity of preambles corresponding to the group A may be different from those of the resource transmitted in the non-coverage enhancement way. In this embodiment, a size of a message in the group A and a power offset value in a message in the group B may be further configured, so that a user that uses the resource at the coverage enhancement level compares the size of the message in the group A with a size of message 3 to be transmitted by the user, to determine whether a preamble codeword in the group A or a preamble codeword in the group B is used, and to determine, when the preamble codeword in the group B is used, a power offset value that needs to be used when message 3 is transmitted.

Certainly, during specific implementation, when frequency-domain resource locations configured for the coverage enhancement level and the non-coverage enhancement level by the base station are different, that is, a frequency-domain offset corresponding to the coverage enhancement level is different from a prach-FreqOffset value, and when time-domain resources configured for the coverage enhancement level and the non-coverage enhancement level by the base station do not overlap partially, the base station may not need to configure a codeword resource for the coverage enhancement level.

In this way, when the user equipment receives configuration information delivered by the base station, if the base station has configured a codeword resource for a coverage enhancement level and time-domain or frequency-domain resources configured for different coverage enhancement levels are the same, the user uses the configured codeword resource; if the base station does not configure a codeword resource for the coverage enhancement level, the user uses a preamble codeword resource used by a non-coverage enhancement user equipment (including a codeword resource that is used by the user and is configured for a resource transmitted in a non-coverage enhancement way, such as a root sequence, a total quantity of preambles, a quantity of preambles in the group A, a size of message 3 in the group A, or a power offset value during transmission of message 3 in the group B).

During specific implementation, when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble. For example, assuming that the base station has configured the root sequence for each coverage enhancement level, but does not configure the total quantity of preambles and the quantity of preambles in the group A for each coverage enhancement level, the user equipment uses, when to obtain a codeword corresponding to the coverage enhancement level, the root sequence configured for the coverage enhancement level by the base station and a total quantity of preambles and a quantity of preambles in the group A that are configured for a non-coverage enhancement level, to obtain the codeword; or when the user equipment does not receive the configuration information of the codeword resource, the user equipment uses configuration information of a codeword resource configured for a non-coverage enhancement level, to obtain a codeword for an enhanced transmission of the preamble, that is, the user equipment uses a codeword resource that is used by the user and that is configured for a resource transmitted in a non-coverage enhancement way, to obtain the codeword, where the codeword resource includes a root sequence, a total quantity of preambles, a quantity of preambles in the group A, a size of message 3 in the group A, a power offset value during transmission of message 3 in the group B, or the like.

In this embodiment, an example of a manner of configuring root sequences of preambles for a non-coverage enhancement level and a coverage enhancement level by the base station is shown as the following code segment 2:

```
code segment 2:
PRACH-ConfigSIB ::=         SEQUENCE {
    rootSequenceIndex           INTEGER (0..837),
    rootSequenceIndex_Level1    INTEGER (0..839),
    rootSequenceIndex_Level2    INTEGER (0..897),
    rootSequenceIndex_Level3    INTEGER (0..857),
      prach-ConfigInfo          PRACH-ConfigInfo
}.
```

Therefore, in this embodiment, an example of a manner of configuring total quantities of preambles and quantities of preambles in the group A for a non-coverage enhancement level and a coverage enhancement level by the base station is shown as the following code segment 3:

```
RACH-ConfigCommon:
    numberOfRA-Preambles            ENUMERATED {
        n4, n8, n12, n16, n20, n24, n28,
        n32, n36, n40, n44, n48, n52, n56,
        n60, n64},
    preamblesGroupAConfig           SEQUENCE {
        sizeOfRA-PreamblesGroupA        ENUMERATED {
            n4, n8, n12, n16, n20, n24, n28,
            n32, n36, n40, n44, n48, n52, n56,
            n60},
        numberOfRA-Preambles_Level 1    ENUMERATED {
            n4, n8, n12, n16, n20, n24, n28,
            n32, n36, n40, n44, n48, n52, n56,
            n60, n64},
    preamblesGroupAConfig           SEQUENCE {
        sizeOfRA-PreamblesGroupA_Level 1    ENUMERATED {
            n4, n8, n12, n16, n20, n24, n28,
            n32, n36, n40, n44, n48, n52, n56,
        n60},
            numberOfRA-Preambles_Level 2
ENUMERATED {
    n4, n8, n12, n16, n20, n24, n28,
    n32, n36, n40, n44, n48, n52, n56,
    n60, n64},
            preamblesGroupAConfig
SEQUENCE {
            sizeOfRA-PreamblesGroupA_Level 2
ENUMERATED {
    n4, n8, n12, n16, n20, n24, n28,
    n32, n36, n40, n44, n48, n52, n56,
    n60},
            numberOfRA-Preambles_Level 3
ENUMERATED {
    n4, n8, n12, n16, n20, n24, n28,
    n32, n36, n40, n44, n48, n52, n56,
    n60, n64},
            preamblesGroupAConfig
SEQUENCE {
            sizeOfRA-PreamblesGroupA_Level 3
ENUMERATED {
    n4, n8, n12, n16, n20, n24, n28,
    n32, n36, n40, n44, n48, n52, n56,
    n60},
            messageSizeGroupA
ENUMERATED {b56, b144, b208, b256},
            messagePowerOffsetGroupB
ENUMERATED {
    minusinfinity, dB0, dB5, dB8, dB10, dB12,
    dB15, dB18},
            messageSizeGroupA_Level 1
ENUMERATED {b56, b144, b208, b256},
            messagePowerOffsetGroupB_Level  1
ENUMERATED {
    minusinfinity, dB0, dB5, dB8, dB10, dB12,
    dB15, dB18},
            messageSizeGroupA_Level 2
ENUMERATED {b56, b144, b208, b256},
            messagePowerOffsetGroupB_Level  2
ENUMERATED {
    minusinfinity, dB0, dB5, dB8, dB10, dB12,
    dB15, dB18},
            messageSizeGroupA_Level 3
ENUMERATED {b56, b144, b208, b256},
            messagePowerOffsetGroupB_Level  3
ENUMERATED {
    minusinfinity, dB0, dB5, dB8, dB10, dB12,
    dB15, dB18}.
```

It can be seen from above that in this embodiment, a base station configures a supported coverage enhancement level and a PRACH resource corresponding to the coverage enhancement level; and the base station transmits, to user equipment, a resource index and/or resource configuration information of the PRACH resource configured for the coverage enhancement level, so that the user equipment acquires the corresponding PRACH resource, and transmits a preamble on the acquired PRACH resource. Therefore, a PRACH resource can be configured for user equipment that works in a coverage enhancement mode.

Figure 3:
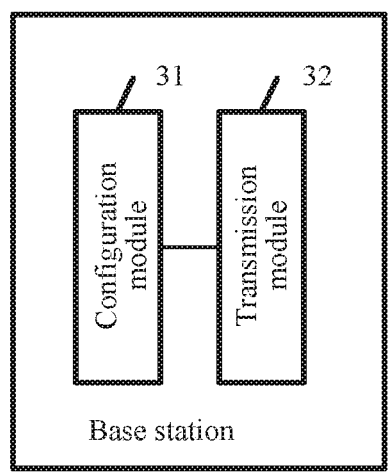
FIG. 3 is a schematic structural composition diagram of an embodiment of a base station according to the embodiments.

FIG. 3 is a schematic structural composition diagram of an embodiment of a base station according to the embodiments. As shown in FIG. 3, the base station may include a configuration module 31 and a transmission module 32.

The configuration module 31 is configured to configure a coverage enhancement level supported by the base station and a PRACH resource corresponding to the coverage enhancement level. The transmission module 32 is configured to transmit, to user equipment, a resource index and/or resource configuration information of the PRACH resource configured for the coverage enhancement level, so that the user equipment acquires the corresponding PRACH resource, and transmits a preamble on the acquired PRACH resource.

During specific implementation, when configuring a coverage enhancement level supported by the base station and a PRACH resource corresponding to the coverage enhancement level, the configuration module 31 may configure a coverage enhancement level currently supported by the base station and a PRACH resource corresponding to the coverage enhancement level, or configure all coverage enhancement levels supported by the base station and PRACH resources corresponding to the coverage enhancement levels and indicate a coverage enhancement level currently supported by the base station.

During specific implementation, the PRACH resource configured by the configuration module 31 may include a time-domain resource, and resource configuration information of the time-domain resource may include at least one of: a preamble format, a density of enhanced transmission opportunities of a preamble, a transmission opportunity of a preamble for an enhanced transmission at a density, or a quantity of repetitions for each enhanced transmission of a preamble. In addition, the configuration module 31 configures a same preamble format for different coverage enhancement levels or configures different preamble formats for different coverage enhancement levels respectively. The density of the enhanced transmission opportunities of the preamble refers to a quantity of transmission opportunities that an enhanced transmission can be performed on the preamble within a time period. The transmission opportunity refers to a time-domain starting location of a radio frame for each enhanced transmission of the preamble within the time period. As shown in FIG. 2, using time periods Density 0 and Density 1 as an example, within the time period Density 0, there are only two enhanced transmission opportunities of a random preamble. That is, within the time Density 0, a density of the enhanced transmission opportunities of the preamble is 2. In addition, there may be two choices for the two enhanced transmission opportunities of the random preamble, namely, two resource versions, for example, Level 1 PRACH configuration index 0 (where 'Level 1' represents a coverage enhancement level, and 'V1' represents a resource version) and Level 1 PRACH configuration index 1 (where 'Level 1' represents a coverage enhancement level, and 'V2' represents a resource version). It can be known from FIG. 2 that, in the resource versions V1 and V2, time-domain starting locations of radio frames for an enhanced transmission of a preamble and quantities of radio frames are different. However, within the time period Density 1, there are four enhanced transmission opportunities for a random preamble. That is, within the time Density 1, a density of the enhanced transmission opportunities of the preamble is 4. In addition, there may also be two choices for the four enhanced transmission opportunities of the random preamble, namely, two resource versions, for example, Level 1 PRACH configuration index 2 (where 'Level 1' represents a coverage enhancement level, and 'V1' represents a resource version) and Level 1 PRACH configuration index 3 (where 'Level 1' represents a coverage enhancement level, and 'V2' represents a resource version).

During specific implementation, when the PRACH resource configured by the configuration module 31 includes a time-domain resource, the configuration module 31 may further configure a resource index for the time-domain resource, where each index is corresponding to resource configuration information of one time-domain resource. In this way, both the base station and the user equipment in this embodiment may store configuration information of a time-domain resource corresponding to a coverage enhancement level supported by a communications protocol, and the transmission module 32 may transmit, to the user equipment, a resource index of a PRACH resource configured for each coverage enhancement level, so that the user equipment queries for corresponding resource configuration information of a time-domain resource by using the index. Therefore, the base station may not need to transmit the detailed configuration information of the time-domain resource to the user equipment, which saves system resources.

During specific implementation, when configuring the density of the enhanced transmission opportunities of the preamble and the enhanced transmission opportunity of the preamble at the density, the configuration module 31 may specifically configure a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for an enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index. For example, for the coverage enhancement level Level 1, the base station may configure, according to Table 1, a radio frame period for an enhanced transmission of a preamble as 80 radio frames, and configure a starting radio frame number list used to transmit the preamble within each radio frame period, as shown in the fourth column of Table 1. For example, assuming that an index of a time-domain resource received by the user equipment is 5, the user equipment learns, by means of query, that a radio frame period, corresponding to the resource index 5, for the enhanced transmission of the preamble is 80 radio frames and that starting radio frame numbers used to transmit the preamble within each radio frame period are the $20^{th}$ frame and the $60^{th}$ frame. Therefore, it is determined that, at the coverage enhancement level Level 1, the radio frame period for the enhanced transmission of the preamble is 80 radio frames and starting frame locations for the enhanced transmission of the preamble are the $20^{th}$ frame and the $60^{th}$ frame. That is, at the coverage enhancement level Level 1, a density of enhanced transmissions of the preamble in 80 frames is 2, and specific transmission opportunities start at the $20^{th}$ frame and the $60^{th}$ frame in the 80 frames.

During specific implementation, when configuring the quantity of repetitions for each enhanced transmission of the preamble, the configuration module 31 may specifically configure the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble. For example, still using a configured time-domain resource at the Level 1 in Table 1 as an example, in Table 1, it can be learnt, by means of query according to all resource indexes configured for the Level 1, that the radio frame number list including the maximum of starting radio frame numbers used to transmit the preamble within each radio frame period is a radio frame number list corresponding to an index 10, where the starting radio frame numbers, used to transmit the preamble, included in the list are successively "0, 5, 10, 15, 20, 25, 30, 35, 40, 45, 50, 55, 60, 65, 70, and 75". It can be known from this item that, two consecutive enhanced transmission opportunities of a preamble are separated by five consecutive radio frames, and in this way, corresponding to the coverage enhancement level Level 1, one enhanced transmission occupies five consecutive radio frames, that is, each enhanced transmission of a preamble performed by the user equipment is repeatedly performed within the five consecutive radio frames.

Alternatively, when configuring the quantity of repetitions for each enhanced transmission of the preamble, the configuration module 31 specifically configures a starting frame number list used to transmit the preamble within each radio frame period and a quantity of radio frames used to continuously transmit the preamble after each starting frame (the configuration manner differs from the foregoing manner in that the quantity of radio frames used to transmit the preamble after the starting frame numbers is explicitly indicated, instead of being implicitly indicated by using a list), so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index. For example, still using a configured time-domain resource at the Level 1 in Table 1 as an example, in Table 1, starting radio frame numbers that are used to transmit the preamble within each radio frame period and that are corresponding to all resource indexes can be learnt by means of query. For example, starting radio frame numbers corresponding to an index 4 are the 0th frame and the 40th frame. In addition, in this embodiment, 10 frames after the $0^{th}$ starting radio frame and 10 frames after the 40th starting radio frame may be further directly configured to continuously transmit the preamble. Therefore, corresponding to the coverage enhancement level Level 1, when a resource configuration corresponding to the index 4 is used, a starting frame for one enhanced transmission is the 0th frame, and the enhanced transmission occupies 10 consecutive radio frames, that is, each enhanced transmission of a preamble is repeatedly performed within the 10 consecutive radio frames.

Alternatively, when configuring the quantity of repetitions for each enhanced transmission of the preamble, the configuration module 31 further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; for example, still using a configured time-domain resource at the Level 1 in Table 1 as an example, the fifth column in Table 1 is a configured quantity of subframe numbers that are used to transmit the preamble in each radio frame. For example, referring to Table 1, it can be learnt, from the fourth column in Table 1, that when a resource configuration of the index 4 is used for the coverage enhancement level Level 1, starting radio frame numbers used for enhanced transmissions of the preamble are the 0th frame and the 40th frame. The fifth column in Table 1 is further queried, and it may be learnt that there is one subframe number that is used to transmit the preamble in the 0th frame and the 40th frame. Therefore, after the base station delivers the index 4 of the time-domain resource to the user equipment, the user equipment using a resource at the coverage enhancement level Level 1 can learn, by means of query according to the index 4, that the starting radio frame numbers used for the enhanced transmissions of the preamble are the 0th frame and the 40th frame, and that there is one subframe number that is used to transmit the preamble in the 0th frame and the 40th frame. Certainly, during specific implementation, one column may be further added to Table 1 to indicate a subframe number that is used to transmit the preamble in each radio frame, so that the user equipment can learn the subframe number by means of query; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level, where this manner differs from the foregoing manner in that, a subframe number configured for the resource at the non-coverage enhancement level may be directly used without reconfiguring a subframe number that is used for an enhanced transmission of the preamble in each radio frame. For details of resource configuration information of the non-coverage enhancement level, refer to Table 2, where "Subframe number" is a subframe number that may be specifically used for an enhanced transmission of a preamble.

In conclusion, in this embodiment, a transmission quantity, of a preamble, corresponding to one enhanced transmission is finally determined by a configured starting frame number of a radio frame for an enhanced transmission of a preamble, a quantity of radio frames used to continuously transmit the preamble after the starting frame number, and a quantity of subframe numbers that are used to transmit the preamble in each radio frame. For example, when a starting frame number of one radio frame used to transmit a preamble is set to 0, a quantity of radio frames used to continuously transmit the preamble after the starting frame number is set to 5, and a quantity of subframes that are used to transmit the preamble in each radio frame is set to 2, in response to one enhanced transmission at a corresponding coverage enhancement level, a preamble is repeatedly transmitted for 10 times.

In this embodiment, resource configuration information configured for each coverage enhancement level by a base station and an index of each resource configuration are recorded by using a resource configuration information table. As described in the method embodiment, Table 1, Table 3, and Table 4 are resource configuration information tables for different coverage enhancement levels in a frequency division duplexing (Frequency Division Duplexing, FDD) system in the embodiments (Table 1 is a resource configuration information table for a coverage enhancement level Level 1, Table 3 is a resource configuration information table for a coverage enhancement level Level 2, and Table 4 is a resource configuration information table for a coverage enhancement level Level 3). A format of a subframe that is used to transmit a preamble in each radio frame may be shown in Table 2.

It can be learnt from Table 1 to Table 4 that indexes configured for resources at different coverage enhancement levels are provided for different tables separately. During specific implementation, the base station may configure different indexes for user equipments at three different coverage enhancement levels in three different tables, to indicate resource configurations for the different coverage enhancement levels. For example, a resource, for a non-enhanced transmission of a preamble, configured for a common user by the base station is indexed according to Table 2, where a subframe number that is used to transmit a preamble in each radio frame is included. Resources, configured for a user that needs to use a coverage enhancement resource, for enhanced transmissions of a preamble are indexed according to indexes in Table 1, Table 3, and Table 4. A quantity of subframe numbers includes a quantity of subframe numbers that are used to transmit a preamble in each radio frame. That which specific subframe number or subframe numbers are used is determined by an index that is configured, by an eNB for a user that uses a resource at a non-coverage enhancement level, to transmit a preamble, that is, determined according to Table 2. Alternatively, resources, configured for different coverage enhancement levels, for enhanced transmissions of a preamble may be indexed according to one table, namely Table 1, but resources corresponding to different indexes are used during the configuration. For example, when the eNB sets an index value of a time-domain resource at the coverage enhancement level 1 to 4, UE can learn the following by querying the table: a used random preamble format is 0; a location for an enhanced transmission opportunity calculated by using 80 radio frames as a period is that a system frame number (SFN) 0 or 40 is used as a starting location in a radio frame, where the result is obtained after a modulus operation is performed on 80; and one radio frame includes one subframe number. That which specific subframe number is used is determined by an index that is configured, by the eNB for a user that uses a resource at a non-coverage enhancement level, to transmit a preamble. For example, if the index is 5, a random preamble is transmitted by using a subframe whose subframe number in a radio frame is 5 as a starting point.

During specific implementation, the PRACH resource configured by the configuration module 31 may include a frequency-domain resource, configuration information of the frequency-domain resource may include a frequency offset value (frequency offset), and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station, During specific implementation, when the PRACH resource configured by the configuration module 31 includes the frequency-domain resource, the transmission module 32 may transmit, to the user equipment, the frequency offset value configured for the coverage enhancement level.

During specific implementation, the configuration module 31 may configure a same frequency offset value for different coverage enhancement levels, to indicate a same offset of starting locations, with respect to the starting location of the carrier frequency band, for the enhanced transmissions of the preambles at all the coverage enhancement levels supported by the base station; in this way, when receiving the same frequency offset value configured for the different coverage enhancement levels by the base station, the user equipment uses the same frequency offset value as the offset of the starting locations, with respect to the starting location of the carrier frequency band, for the enhanced transmissions of the preambles at all the coverage enhancement levels supported by the base station; or the configuration module 31 may configure a same frequency offset value for different coverage enhancement levels, to indicate same frequency separation between each coverage enhancement level and a previous adjacent coverage enhancement level; in this way, when receiving the same frequency offset value configured for the different coverage enhancement levels by the base station, the user equipment uses the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the configuration module 31 may configure multiple different frequency offset values, where each frequency offset value is used to indicate a frequency offset of a starting location, with respect to the starting location of the carrier frequency band, for an enhanced transmission of a preamble at a coverage enhancement level; in this way, when receiving a frequency offset value configured for each coverage enhancement level by the base station, the user equipment uses the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

During specific implementation, with reference to configurations in Table 1 to Table 4, the base station (for example, an eNB) may transmit, in an SIB, an index configured for the time-domain resource corresponding to the supported coverage enhancement level. In addition, the base station may further transmit, in the SIB, a frequency offset value of the frequency-domain resource corresponding to the supported coverage enhancement level. For the two resource configurations, the configurations in the SIB may be as shown in the foregoing code segment 1, and code segment 1 and meanings of code in code segment 1 are not repeated described herein.

During specific implementation, when frequency-domain resource locations configured for a coverage enhancement level and a non-coverage enhancement level by the base station are the same, that is, a frequency-domain offset corresponding to the coverage enhancement level is the same as a prach-FreqOffset value, and when time-domain resources configured for the coverage enhancement level and the non-coverage enhancement level by the base station overlap partially, the base station may configure, for the coverage enhancement level, a codeword resource different from that configured for the non-coverage enhancement level. For user equipment that uses a configuration of a resource transmitted in a non-coverage enhancement way, a preamble configuration includes a total quantity of preambles configured in a cell. These preambles are classified into two groups, namely a group A and a group B. The user equipment that uses the configuration of the resource transmitted in the non-coverage enhancement way determines to use a codeword in the group A or the group B according to a size of transmitted message 3. The configuration includes a quantity of preamble codewords in the group A, and a quantity of codewords corresponding to the group B may be implicitly obtained by the total quantity of preambles configured in the cell minus the quantity of preamble codewords in the group A in the configuration.

In this embodiment, the codeword resource configured for the coverage enhancement level by the configuration module 31 includes at least one of the following configured for each coverage enhancement level: a total quantity of preambles, a quantity of preambles corresponding to the group A, or a root sequence. During specific implementation, the root sequence configured for each coverage enhancement level by the configuration module 31 may be the same as a root sequence of a resource transmitted in a non-coverage enhancement way, but the total quantity of preambles configured for each coverage enhancement level and the quantity of preambles corresponding to the group A may be different from those of the resource transmitted in the non-coverage enhancement way. In this embodiment, a size of a message in the group A and a power offset value in a message in the group B may be further configured, so that a user that uses the resource at the coverage enhancement level compares the size of the message in the group A with a size of message 3 to be transmitted by the user, to determine whether a preamble codeword in the group A or a preamble codeword in the group B is used, and to determine, when the preamble codeword in the group B is used, a power offset value that needs to be used when message 3 is transmitted.

Certainly, during specific implementation, when frequency-domain resource locations configured for the coverage enhancement level and the non-coverage enhancement level by the configuration module 31 are different, that is, a frequency-domain offset corresponding to the coverage enhancement level is different from a prach-FreqOffset value, and when time-domain resources configured for the coverage enhancement level and the non-coverage enhancement level by the configuration module 31 do not overlap partially, the configuration module 31 may not need to configure a codeword resource for the coverage enhancement level.

In this way, when the user equipment receives configuration information delivered by the transmission module 32, if the base station has configured a codeword resource for a coverage enhancement level and time-domain or frequency-domain resources configured for different coverage enhancement levels are the same, the user uses the configured codeword resource; if the base station does not configure a codeword resource for the coverage enhancement level, the user uses a preamble codeword resource used by a non-coverage enhancement user equipment (including a codeword resource that is used by the user and is configured for a resource transmitted in a non-coverage enhancement way, such as a root sequence, a total quantity of preambles, a quantity of preambles in the group A, a size of message 3 in the group A, or a power offset value during transmission of message 3 in the group B).

During specific implementation, when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble. For example, assuming that the base station has configured the root sequence for each coverage enhancement level, but does not configure the total quantity of preambles and the quantity of preambles in the group A for each coverage enhancement level, the user equipment uses, when to obtain a codeword corresponding to the coverage enhancement level, the root sequence configured for the coverage enhancement level by the base station and a total quantity of preambles and a quantity of preambles in the group A that are configured for a non-coverage enhancement level, to obtain the codeword; or when the user equipment does not receive the configuration information of the codeword resource, the user equipment uses configuration information of a codeword resource configured for a non-coverage enhancement level, to obtain a codeword for an enhanced transmission of the preamble, that is, the user equipment uses a codeword resource that is used by the user and that is configured for a resource transmitted in a non-coverage enhancement way, to obtain the codeword, where the codeword resource includes a root sequence, a total quantity of preambles, a quantity of preambles in the group A, a size of message 3 in the group A, a power offset value during transmission of message 3 in the group B, or the like.

In this embodiment, an example of a manner of configuring root sequences of preambles for a non-coverage enhancement level and a coverage enhancement level by the base station is shown as the foregoing code segment 2. An example of a manner of configuring total quantities of preambles and quantities of preambles in the group A for a non-coverage enhancement level and a coverage enhancement level by the base station is shown as code segment 3. Content of code segment 2, and content of code segment 3, and meanings of code in the code segments are not repeatedly described herein.

It can be seen from above that in this embodiment, a base station configures a supported coverage enhancement level and a PRACH resource corresponding to the coverage enhancement level; and the base station transmits, to user equipment, a resource index and/or resource configuration information of the PRACH resource configured for the coverage enhancement level, so that the user equipment acquires the corresponding PRACH resource, and transmits a preamble on the acquired PRACH resource. Therefore, a PRACH resource can be configured for user equipment that works in a coverage enhancement mode.

Figure 4:
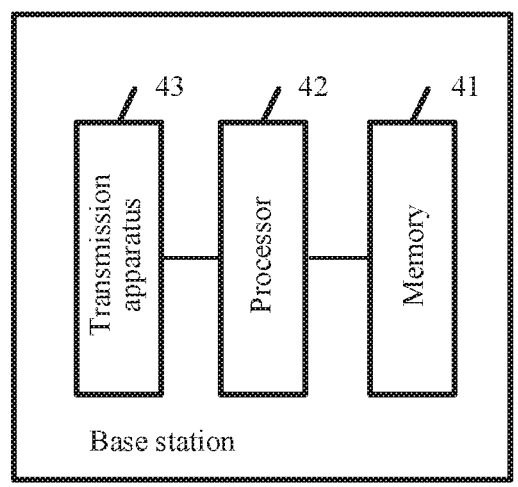
FIG. 4 is a schematic structural composition diagram of another embodiment of a base station according to the embodiments.

FIG. 4 is a schematic structural composition diagram of another embodiment of a base station according to the embodiments. As shown in FIG. 4, the base station may include a memory 41, a processor 42, and a transmission apparatus 43.

The processor 42 invokes a program stored in the memory 41, to configure a coverage enhancement level supported by the base station and a PRACH resource corresponding to the coverage enhancement level.

The transmission apparatus 43 is configured to transmit, to user equipment, a resource index and/or resource configuration information of the PRACH resource configured for the coverage enhancement level by the processor 42, so that the user equipment acquires the corresponding PRACH resource, and transmits a preamble on the acquired PRACH resource.

In some feasible implementation manners, the processor 42 is specifically configured to: configure a coverage enhancement level currently supported by the base station and a PRACH resource corresponding to the coverage enhancement level, or configure all coverage enhancement levels supported by the base station and PRACH resources corresponding to the coverage enhancement levels and indicate a coverage enhancement level currently supported by the base station.

In some feasible implementation manners, the PRACH resource configured by the processor 42 includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble.

When the resource includes the time-domain resource, the transmission apparatus 43 is specifically configured to transmit, to the user equipment, a resource index of a time-domain resource configured for the one or more coverage enhancement levels, where each index is corresponding to resource configuration information of one time-domain resource.

In some feasible implementation manners, when configuring the density of the enhanced transmission opportunities of the preamble and the enhanced transmission opportunity of the preamble at the density, the processor 42 specifically configures a radio frame period for an enhanced transmission of the preamble and a starting radio frame number list used to transmit the preamble within each radio frame period, so that after receiving the resource index of the time-domain resource configured for the coverage enhancement level by the base station, the user equipment queries for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

In some feasible implementation manners, when configuring the quantity of repetitions for each enhanced transmission of the preamble, the processor 42 specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving all resource indexes of time-domain resources configured for the coverage enhancement level by the base station, the user equipment queries, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the processor 42 specifically configures a starting frame number list used to transmit the preamble within each radio frame period and a quantity of radio frames used to continuously transmit the preamble after each starting frame, so that after receiving the resource index of the time-domain resource configured for the coverage enhancement level by the base station, the user equipment queries for the starting frame number list used to transmit the preamble within each radio frame period and the quantity of radio frames used to continuously transmit the preamble after each starting frame, where the list and the quantity are corresponding to the resource index.

In some feasible implementation manners, when configuring the quantity of repetitions for each enhanced transmission of the preamble, the processor 42 further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving the resource index of the time-domain resource configured for the coverage enhancement level by the base station, the user equipment queries for the quantity of subframe numbers or the subframe number, where the subframe number is used to transmit the preamble in each radio frame, and the quantity or the subframe number is corresponding to the resource index; or so that after receiving the resource index of the time-domain resource configured for the coverage enhancement level by the base station, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level.

In some feasible implementation manners, when configuring a supported coverage enhancement level and a PRACH resource corresponding to each coverage enhancement level, the processor 42 configures a same preamble format for different coverage enhancement levels or configures different preamble formats for different coverage enhancement levels respectively.

In some feasible implementation manners, the PRACH resource configured by the processor 42 includes a frequency-domain resource, configuration information of the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the transmission apparatus is specifically configured to transmit, to the user equipment, a frequency offset value configured for each coverage enhancement level.

In some feasible implementation manners, the processor 42 configures a same frequency offset value for different coverage enhancement levels, to indicate a same offset of starting locations, with respect to the starting location of the carrier frequency band, for enhanced transmissions of preambles at all coverage enhancement levels supported by the base station; or the processor 42 configures a same frequency offset value for different coverage enhancement levels, to indicate same frequency separation between each coverage enhancement level and a previous adjacent coverage enhancement level; or the processor 42 configures multiple different frequency offset values, where each frequency offset value is used to indicate a frequency offset of a starting location, with respect to the starting location of the carrier frequency band, for an enhanced transmission of a preamble at a coverage enhancement level.

In some feasible implementation manners, the PRACH resource configured by the processor 42 further includes a codeword resource, and configuration information of the codeword resource configured by the processor includes at least one of the following configured for each coverage enhancement level: a total quantity of preambles, a quantity of preambles corresponding to a group A, or a root sequence; and when the resource includes the codeword resource, the transmission apparatus is specifically configured to transmit, to the user equipment, the configuration information of the codeword resource configured for each coverage enhancement level, so that when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or so that when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or so that when the user equipment does not receive the configuration information of the codeword resource, the user equipment uses configuration information of a codeword resource configured for a non-coverage enhancement level, to obtain a codeword for an enhanced transmission of the preamble.

Figure 5:
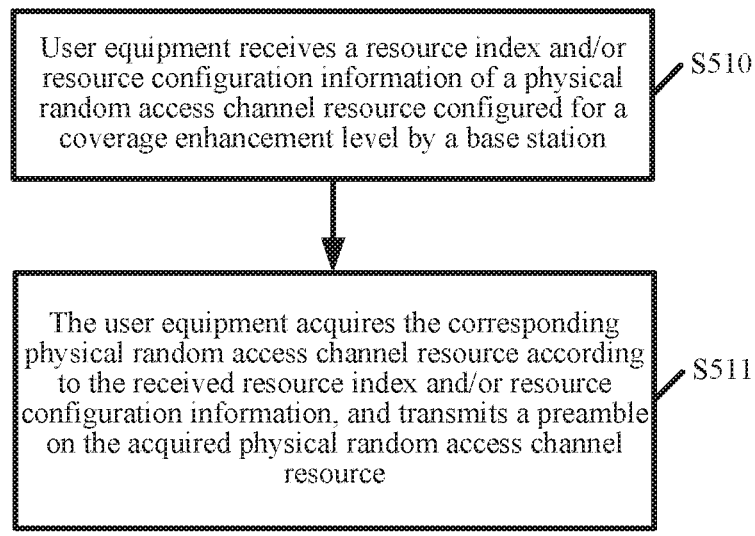
FIG. 5 is a schematic flowchart of an embodiment of a method for acquiring a PRACH resource configuration according to the embodiments.

FIG. 5 is a schematic flowchart of an embodiment of a method for acquiring a PRACH resource configuration according to the embodiments. As shown in FIG. 5, the method may include:

Step S510: User equipment receives a resource index and/or resource configuration information of a PRACH resource configured for a coverage enhancement level by a base station.

Step S511: The user equipment acquires the corresponding PRACH resource according to the received resource index and/or resource configuration information, and transmits a preamble on the acquired PRACH resource.

During specific implementation, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble, where the density of the enhanced transmission opportunities of the preamble refers to a quantity of transmission opportunities that an enhanced transmission can be performed on the preamble within a time period. The transmission opportunity refers to a time-domain starting location of a radio frame for each enhanced transmission of the preamble within the time period. As shown in FIG. 2, using time periods Density 0 and Density 1 as an example, within the time period Density 0, there are only two enhanced transmission opportunities of a random preamble. That is, within the time Density 0, a density of the enhanced transmission opportunities of the preamble is 2. In addition, there may be two choices for the two enhanced transmission opportunities of the random preamble, namely, two resource versions, for example, Level 1 PRACH configuration index 0 (where 'Level 1' represents a coverage enhancement level, and 'V1' represents a resource version) and Level 1 PRACH configuration index 1 (where 'Level 1' represents a coverage enhancement level, and 'V2' represents a resource version). It can be known from FIG. 2 that, in the resource versions V1 and V2, time-domain starting locations of radio frames for an enhanced transmission of a preamble and quantities of radio frames are different. However, within the time period Density 1, there are four enhanced transmission opportunities for a random preamble. That is, within the time Density 1, a density of the enhanced transmission opportunities of the preamble is 4. In addition, there may also be two choices for the four enhanced transmission opportunities of the random preamble, namely, two resource versions, for example, Level 1 PRACH configuration index 2 (where 'Level 1' represents a coverage enhancement level, and 'V1' represents a resource version) and Level 1 PRACH configuration index 3 (where 'Level 1' represents a coverage enhancement level, and 'V2' represents a resource version).

When the resource includes the time-domain resource, the user equipment receives a resource index of a time-domain resource configured for the one or more coverage enhancement levels by the base station, where each index is corresponding to resource configuration information of one time-domain resource. In this way, before step S510, both the base station and the user equipment in this embodiment of the embodiments may store configuration information of a time-domain resource corresponding to a coverage enhancement level supported by a communications protocol, and in step S510, the base station may transmit, to the user equipment, a resource index of a PRACH resource configured for each coverage enhancement level, so that the user equipment queries for corresponding resource configuration information by using the index. Therefore, the base station may not need to transmit the detailed configuration information of the time-domain resource to the user equipment, which saves system resources.

During specific implementation, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period, so that after receiving, in step S510, the resource index of the time-domain resource configured for the coverage enhancement level by the base station, in step 511, the user equipment queries for the radio frame period for the enhanced transmission of the preamble and the starting radio frame number used to transmit the preamble within each radio frame period, to determine the radio frame period for the enhanced transmission of the preamble and the radio frame number, where the radio frame period and the starting radio frame number are corresponding to the resource index. For example, for the coverage enhancement level Level 1, the base station may configure, according to Table 1, a radio frame period for an enhanced transmission of a preamble as 80 radio frames, and configure a starting radio frame number list used to transmit the preamble within each radio frame period, as shown in the fourth column of Table 1. For example, assuming that an index of a time-domain resource received by the user equipment is 5, the user equipment learns, by means of query, that a radio frame period, corresponding to the resource index 5, for the enhanced transmission of the preamble is 80 radio frames and that starting radio frame numbers used to transmit the preamble within each radio frame period are the $20^{th}$ frame and the $60^{th}$ frame. Therefore, it is determined that, at the coverage enhancement level Level 1, the radio frame period for the enhanced transmission of the preamble is 80 radio frames and starting frame locations for the enhanced transmission of the preamble are the $20^{th}$ frame and the $60^{th}$ frame. That is, at the coverage enhancement level Level 1, a density of enhanced transmissions of the preamble in 80 frames is 2, and specific transmission opportunities start at the $20^{th}$ frame and the $60^{th}$ frame in the 80 frames.

During specific implementation, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble, so that after receiving, in step S510, all resource indexes of time-domain resources configured for the coverage enhancement level by the base station, in step S511, the user equipment queries, according to the resource indexes, the radio frame number list including the maximum of starting radio frame numbers used to transmit the preamble within each radio frame period, to determine the quantity of radio frames used to continuously transmit the preamble. For example, still using a configured time-domain resource at the Level 1 in Table 1 as an example, in Table 1, the user equipment can learn, by means of query according to all resource indexes configured for the Level 1, that the radio frame number list including the maximum of starting radio frame numbers used to transmit the preamble within each radio frame period is a radio frame number list corresponding to an index 10, where the starting radio frame numbers, used to transmit the preamble, included in the list are successively "0, 5, 10, 15, 20, 25, 30, 35, 40, 45, 50, 55, 60, 65, 70, and 75". It can be known from this item that, two consecutive enhanced transmission opportunities of a preamble are separated by five consecutive radio frames, and in this way, corresponding to the coverage enhancement level Level 1, one enhanced transmission occupies five consecutive radio frames, that is, each enhanced transmission of a preamble performed by the user equipment is repeatedly performed within the five consecutive radio frames.

Alternatively, when configuring the quantity of repetitions for each enhanced transmission of the preamble, the base station specifically configures a starting frame number list used to transmit the preamble within each radio frame period and a quantity of radio frames used to continuously transmit the preamble after each starting frame, so that after receiving, in step S510, the resource index of the time-domain resource configured for the coverage enhancement level by the base station, in step S511, the user equipment queries for the starting frame number list used to transmit the preamble within each radio frame period and the quantity of radio frames used to continuously transmit the preamble after each starting frame, where the list and the quantity are corresponding to the resource index. For example, still using a configured time-domain resource at the Level 1 in Table 1 as an example, in Table 1, the user equipment may learn, by means of query, starting radio frame numbers that are used to transmit the preamble within each radio frame period and that are corresponding to all resource indexes. For example, starting radio frame numbers corresponding to an index 4 are the $0^{th}$ frame and the $40^{th}$ frame. In addition, in this embodiment of the embodiments, 10 frames after the $0^{th}$ starting radio frame and 10 frames after the $40^{th}$ starting radio frame may be further directly configured to continuously transmit the preamble. Therefore, corresponding to the coverage enhancement level Level 1, when a resource configuration corresponding to the index 4 is used, a starting frame for one enhanced transmission is the $0^{th}$ frame, and the enhanced transmission occupies 10 consecutive radio frames, that is, each enhanced transmission of a preamble is repeatedly performed within the 10 consecutive radio frames. In this way, after receiving the index 4, user equipment can learn, by querying the table by using the index 4, that there are two enhanced transmission opportunities within a radio period of 80 frames at the coverage enhancement level Level 1, where the $0^{th}$ radio frame and the $40^{th}$ radio frame are separately used as starting points of the two enhanced transmission opportunities, and each enhanced transmission of a preamble is repeatedly performed within 10 consecutive radio frames.

During specific implementation, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level, so that after receiving, in step S510, the resource index of the time-domain resource configured for the coverage enhancement level by the base station, in step S511, the user equipment queries for the quantity of subframe numbers or the subframe number, where the subframe number is used to transmit the preamble in each radio frame, and the quantity or the subframe number is corresponding to the resource index, for example, still using a configured time-domain resource at the Level 1 in Table 1 as an example, the fifth column in Table 1 is a configured quantity of subframe numbers that are used to transmit the preamble in each radio frame. For example, referring to Table 1, it can be learnt, from the fourth column in Table 1, that, when a resource configuration of the index 4 is used for the coverage enhancement level Level 1, starting radio frame numbers used for enhanced transmissions of the preamble are the $0^{th}$ frame and the $40^{th}$ frame. The fifth column in Table 1 is further queried, and it may be learnt that there is one subframe number that is used to transmit the preamble in the $0^{th}$ frame and the $40^{th}$ frame. Therefore, after the base station delivers the index 4 of the time-domain resource to the user equipment, the user equipment using a resource at the coverage enhancement level Level 1 can learn, by means of query according to the index 4, that the starting radio frame numbers used for the enhanced transmissions of the preamble are the $0^{th}$ frame and the $40^{th}$ frame, and that there is one subframe number that is used to transmit the preamble in the $0^{th}$ frame and the $40^{th}$ frame. Certainly, during specific implementation, one column may be further added to Table 1 to indicate a subframe number that is used to transmit the preamble in each radio frame, so that the user equipment can learn the subframe number by means of query; or so that after receiving, in step S510, the resource index of the time-domain resource configured for the coverage enhancement level by the base station, in step S511, the user equipment queries for the quantity, corresponding to the resource index, of subframe numbers that are used to transmit the preamble in each radio frame, and after receiving a resource index configured for a resource at the non-coverage enhancement level by the base station, the user equipment queries for a subframe number that is used to transmit the preamble in each radio frame and that is corresponding to the resource index configured for the resource at the non-coverage enhancement level, where this manner differs from the foregoing manner in that, a subframe number configured for the resource at the non-coverage enhancement level may be directly used without reconfiguring a subframe number that is used for an enhanced transmission of the preamble in each radio frame. For details of resource configuration information of the non-coverage enhancement level, refer to Table 2, where "Subframe number" is a subframe number that may be specifically used for an enhanced transmission of a preamble.

In conclusion, in this embodiment of the embodiments, a transmission quantity, of a preamble, corresponding to one enhanced transmission is finally determined by a configured starting frame number of a radio frame for an enhanced transmission of a preamble, a quantity of radio frames used to continuously transmit the preamble after the starting frame number, and a quantity of subframes or a location of a subframe, where the subframe is used to transmit the preamble in each radio frame. For example, when a starting frame number of one radio frame used to transmit a preamble is set to 0, a quantity of radio frames used to continuously transmit the preamble after the starting frame number is set to 5, and a quantity of subframes that are used to transmit the preamble in each radio frame is set to 2, in response to one enhanced transmission at a corresponding coverage enhancement level, a preamble is repeatedly transmitted for 10 times.

During specific implementation, the PRACH resource includes a frequency-domain resource, the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the user equipment receives the frequency offset value configured for the coverage enhancement level by the base station.

During specific implementation, the user equipment receives a same frequency offset value configured for different coverage enhancement levels by the base station and uses the same frequency offset value as an offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the user equipment receives a same frequency offset value configured for different coverage enhancement levels by the base station, and uses the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the user equipment receives a frequency offset value configured for each coverage enhancement level by the base station, and uses the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

With reference to the foregoing Table 1 to Table 4, the base station (for example, an eNB) may transmit, in an SIB, an index configured for the time-domain resource corresponding to the supported coverage enhancement level. In addition, the base station may further transmit, in the SIB, a frequency offset value of the frequency-domain resource corresponding to the supported coverage enhancement level. For the two resource configurations, the configurations in the SIB may be as shown in code segment 1:

| | |
|---|---|
| code segment 1: | |
| rootSequenceIndex | INTEGER (0..837), |
| prach-ConfigIndex | INTEGER (0..63), |
| prach_Level 1_ConfigIndex | INTEGER (0..219), |
| prach_Level 2_ConfigIndex | INTEGER (0..139), |
| prach_Level 3_ConfigIndex | INTEGER (0..59), |
| highSpeedFlag | BOOLEAN, |
| zeroCorrelationZoneConfig | INTEGER (0..15), |
| prach-FreqOffset | INTEGER (0..94), |
| prach_Level 1_FreqOffset | INTEGER (0..94), |
| prach_Level 2_FreqOffset | INTEGER (0..94), |
| prach_Level 3_FreqOffset | INTEGER (0..94). |

In the foregoing configuration information, existence of resource configurations for which coverage enhancement levels Level indicates that the base station supports the corresponding coverage enhancement levels, where information segments of:

| | |
|---|---|
| prach_Level 1_ConfigIndex | INTEGER (0..219), |
| prach_Level 2_ConfigIndex | INTEGER (0..139), and |
| prach_Level 3_ConfigIndex | INTEGER (0..59), | represent delivery of index information of time-domain resources, what are carried in INTEGER (0 . . . 219) are all resource indexes configured for the Level 1 by the base station in Table 1, what are carried in INTEGER (0 . . . 139) are all resource indexes configured for the Level 2 by the base station in Table 3, and what are carried in INTEGER (0 . . . 59) are all resource indexes configured for the Level 3 by the base station in Table 4. In this way, after receiving these indexes, the user equipment can obtain, by querying Table 1, a PRACH resource configured for the Level 1, obtain, by querying Table 3, a PRACH resource configured for the Level 2, and obtain, by querying Table 4, a PRACH resource configured for the Level 3. For example, assuming that the user equipment receives a system message including prach-ConfigIndex INTEGER (0) and prach_Level 1_ConfigIndex INTEGER (5) and indicating that 10 consecutive radio frames that are used to transmit a preamble repeatedly after a starting frame, the user equipment may acquire, by querying Table 1 by using the index 5, the following configuration information of the PRACH resource: a preamble format at the coverage enhancement level Level is 0, a radio frame period for an enhanced transmission of the preamble is 80 radio frames, there are two enhanced transmission opportunities for the preamble within the period of the 80 radio frames, and the two enhanced transmission opportunities start at the $20^{th}$ frame and the $60^{th}$ frame respectively; however, there is one subframe number that is used for an enhanced transmission of the preamble in each radio frame. Further, the user equipment may acquire, by querying Table 2 by using the index 0, that the first subframe in each radio frame is used for an enhanced transmission of a preamble, and may learn, according to information that 10 consecutive radio frames are used to repeatedly transmit a preamble after a starting frame, that each repeated transmission of the preamble is continuously and repeatedly performed within the 10 frames after the starting frame of the transmission opportunity.

However, information segments of:

| | |
|---|---|
| prach_Level 1_FreqOffset | INTEGER (0..94), |
| prach_Level 2_FreqOffset | INTEGER (0..94), and |
| prach_Level 3_FreqOffset | INTEGER (0..94) | represent delivery of offset values of frequency-domain resources; and what is carried in prach_Level 1_FreqOffset INTEGER (0 . . . 94) is an offset of a frequency at the Level 1 with respect to the smallest carrier frequency, what is carried in prach_Level 2_FreqOffset INTEGER (0 . . . 94) is an offset of a frequency at the Level 2 with respect to the smallest carrier frequency, and what is carried in prach_Level 3_FreqOffset INTEGER (0 . . . 94) is an offset of a frequency at the Level 3 with respect to the smallest carrier frequency. For the FDD system, the smallest carrier frequency corresponds to a first physical resource block for a PRACH transmission opportunity, where the value is greater than or equal to 0, or less than or equal to a quantity of uplink carrier resource blocks minus 6.

During specific implementation, when frequency-domain resource locations configured for a coverage enhancement level and a non-coverage enhancement level by the base station are the same, that is, a frequency-domain offset corresponding to the coverage enhancement level is the same as a prach-FreqOffset value, and when time-domain resources configured for the coverage enhancement level and the non-coverage enhancement level by the base station overlap partially, the base station may configure, for the coverage enhancement level, a codeword resource different from that configured for the non-coverage enhancement level; configuration information of the codeword resource includes at least one of the following configured for each coverage enhancement level: a total quantity of preambles, a quantity of preambles corresponding to a group A, or a root sequence; and when the resource includes the codeword resource, the user equipment receives the configuration information of the codeword resource configured for each coverage enhancement level by the base station.

In this embodiment, the codeword resource configured for the coverage enhancement level by the base station includes at least one of the following configured for each coverage enhancement level: a total quantity of preambles, a quantity of preambles corresponding to the group A, or a root sequence. During specific implementation, the root sequence configured for each coverage enhancement level by the base station may be the same as a root sequence of a resource transmitted in a non-coverage enhancement way, but the total quantity of preambles configured for each coverage enhancement level and the quantity of preambles corresponding to the group A may be different from those of the resource transmitted in the non-coverage enhancement way. In this embodiment, a size of a message in the group A and a power offset value in a message in the group B may be further configured, so that a user that uses the resource at the coverage enhancement level compares the size of the message in the group A with a size of message 3 to be transmitted by the user, to determine whether a preamble codeword in the group A or a preamble codeword in the group B is used, and to determine, when the preamble codeword in the group B is used, a power offset value that needs to be used when message 3 is transmitted.

Certainly, during specific implementation, when frequency-domain resource locations configured for the coverage enhancement level and the non-coverage enhancement level by the base station are different, that is, a frequency-domain offset corresponding to the coverage enhancement level is different from a prach-FreqOffset value, and when time-domain resources configured for the coverage enhancement level and the non-coverage enhancement level by the base station do not overlap partially, the base station may not need to configure a codeword resource for the coverage enhancement level.

In this way, when the user equipment receives configuration information delivered by the base station, if the base station has configured a codeword resource for a coverage enhancement level and time-domain or frequency-domain resources configured for different coverage enhancement levels are the same, the user uses the configured codeword resource; if the base station does not configure a codeword resource for the coverage enhancement level, the user uses a preamble codeword resource used by a non-coverage enhancement user equipment (including a codeword resource that is used by the user and is configured for a resource transmitted in a non-coverage enhancement way, such as a root sequence, a total quantity of preambles, a quantity of preambles in the group A, a size of message 3 in the group A, or a power offset value during transmission of message 3 in the group B).

During specific implementation, when receiving the configuration information of the codeword resource including the total quantity of preambles, the quantity of preambles corresponding to the group A, and the root sequence that are configured for each coverage enhancement level, the user equipment uses the codeword information configured for the coverage enhancement level, to obtain a codeword for an enhanced transmission of the preamble; or when receiving the resource configuration information of the codeword resource including only a part of the following configured for each coverage enhancement level: the total quantity of preambles, the quantity of preambles corresponding to the group A, or the root sequence, the user equipment uses the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble. For example, assuming that the base station has configured the root sequence for each coverage enhancement level, but does not configure the total quantity of preambles and the quantity of preambles in the group A for each coverage enhancement level, the user equipment uses, when to obtain a codeword corresponding to the coverage enhancement level, the root sequence configured for the coverage enhancement level by the base station and a total quantity of preambles and a quantity of preambles in the group A that are configured for a non-coverage enhancement level, to obtain the codeword; or when the user equipment does not receive the configuration information of the codeword resource, the user equipment uses configuration information of a codeword resource configured for a non-coverage enhancement level, to obtain a codeword for an enhanced transmission of the preamble, that is, the user equipment uses a codeword resource that is used by the user and that is configured for a resource transmitted in a non-coverage enhancement way, to obtain the codeword, where the codeword resource includes a root sequence, a total quantity of preambles, a quantity of preambles in the group A, a size of message 3 in the group A, a power offset value during transmission of message 3 in the group B, or the like.

In this embodiment, an example of a manner of configuring root sequences of preambles for a non-coverage enhancement level and a coverage enhancement level by the base station is shown as the foregoing code segment 2. Details are not repeatedly described herein. In this embodiment, an example of a manner of configuring total quantities of preambles and quantities of preambles in the group A for a non-coverage enhancement level and a coverage enhancement level by the base station is shown as the foregoing code segment 3. Details are not repeatedly described herein.

It can be seen from above that in some embodiments, user equipment receives a resource index and/or resource configuration information of a PRACH resource configured for a coverage enhancement level by a base station; and the user equipment acquires the corresponding PRACH resource according to the received resource index and/or resource configuration information, and transmits a preamble on the acquired PRACH resource. Therefore, a PRACH resource can be configured for user equipment that works in a coverage enhancement mode.

Figure 6:
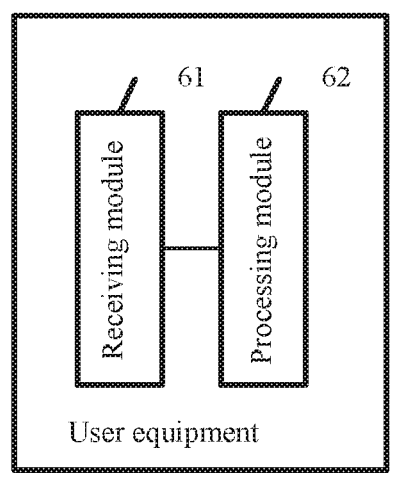
FIG. 6 is a schematic structural composition diagram of an embodiment of user equipment according to the embodiments.

FIG. 6 is a schematic structural composition diagram of an embodiment of user equipment according to embodiments. As shown in FIG. 6, the user equipment according to this embodiment of the embodiments may include: a receiving module 61, configured to receive a resource index and/or resource configuration information of a PRACH resource configured for a coverage enhancement level by a base station; and a processing module 62, configured to: acquire the corresponding PRACH resource according to the resource index and/or resource configuration information received by the receiving module 61, and transmit a preamble on the acquired PRACH resource.

During specific implementation, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble, where the density of the enhanced transmission opportunities of the preamble refers to a quantity of transmission opportunities that an enhanced transmission can be performed on the preamble within a time period. The transmission opportunity refers to a time-domain starting location of a radio frame for each enhanced transmission of the preamble within the time period. As shown in FIG. 2, using time periods Density 0 and Density 1 as an example, within the time period Density 0, there are only two enhanced transmission opportunities of a random preamble. That is, within the time Density 0, a density of the enhanced transmission opportunities of the preamble is 2. In addition, there may be two choices for the two enhanced transmission opportunities of the random preamble, namely, two resource versions, for example, Level 1 PRACH configuration index 0 (where 'Level 1' represents a coverage enhancement level, and 'V1' represents a resource version) and Level 1 PRACH configuration index 1 (where 'Level 1' represents a coverage enhancement level, and 'V2' represents a resource version). It can be known from FIG. 2 that, in the resource versions V1 and V2, time-domain starting locations of radio frames for an enhanced transmission of a preamble and quantities of radio frames are different. However, within the time period Density 1, there are four enhanced transmission opportunities for a random preamble. That is, within the time Density 1, a density of the enhanced transmission opportunities of the preamble is 4. In addition, there may also be two choices for the four enhanced transmission opportunities of the random preamble, namely, two resource versions, for example, Level 1 PRACH configuration index 2 (where 'Level 1' represents a coverage enhancement level, and 'V1' represents a resource version) and Level 1 PRACH configuration index 3 (where 'Level 1' represents a coverage enhancement level, and 'V2' represents a resource version).

When the resource includes the time-domain resource, the receiving module is specifically configured to receive a resource index of a time-domain resource configured for the one or more coverage enhancement levels by the base station, where each index is corresponding to resource configuration information of one time-domain resource. In this way, both the base station and the user equipment in this embodiment may pre-store configuration information of a time-domain resource corresponding to a coverage enhancement level supported by a protocol for base station communication, and the receiving module 60 is configured to receive the resource index of the time-domain resource configured for the one or more coverage enhancement levels by the base station, so that the user equipment queries for corresponding resource configuration information by using the index. Therefore, the base station may not need to transmit the detailed configuration information of the time-domain resource to the user equipment, which saves system resources.

During specific implementation, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period; and the processing module 61 is specifically configured to: after the receiving module 60 receives the resource index of the time-domain resource configured for the coverage enhancement level by the base station, query for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index. For example, for the coverage enhancement level Level 1, the base station may configure, according to Table 1, a radio frame period for an enhanced transmission of a preamble as 80 radio frames, and configure a starting radio frame number list used to transmit the preamble within each radio frame period, as shown in the fourth column of Table 1. For example, assuming that an index of a time-domain resource received by the receiving module 60 is 5, the processing module 61 learns, by means of query, that a radio frame period, corresponding to the resource index 5, for the enhanced transmission of the preamble is 80 radio frames and that starting radio frame numbers used to transmit the preamble within each radio frame period are the $20^{th}$ frame and the $60^{th}$ frame. Therefore, it is determined that, at the coverage enhancement level Level 1, the radio frame period for the enhanced transmission of the preamble is 80 radio frames and starting frame locations for the enhanced transmission of the preamble are the $20^{th}$ frame and the both frame. That is, at the coverage enhancement level Level 1, a density of enhanced transmissions of the preamble in 80 frames is 2, and specific transmission opportunities start at the $20^{th}$ frame and the $60^{th}$ frame in the 80 frames.

During specific implementation, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble; and the processing module 61 is specifically configured to: after the receiving module 60 receives all resource indexes of time-domain resources configured for the coverage enhancement level by the base station, query, according to the resource indexes, for the radio frame number list including the maximum of starting radio frame numbers used to transmit the preamble within each radio frame period, to determine the quantity of radio frames used to continuously transmit the preamble. For example, still using a configured time-domain resource at the Level 1 in Table 1 as an example, in Table 1, the processing module 61 may learn, by means of query according to all resource indexes configured for the Level 1, that the radio frame number list including the maximum of starting radio frame numbers used to transmit the preamble within each radio frame period is a radio frame number list corresponding to an index 10, where the starting radio frame numbers, used to transmit the preamble, included in the list are successively "0, 5, 10, 15, 20, 25, 30, 35, 40, 45, 50, 55, 60, 65, 70, and 75". It can be known from this item that, two consecutive enhanced transmission opportunities of a preamble are separated by five consecutive radio frames, and in this way, corresponding to the coverage enhancement level Level 1, one enhanced transmission occupies five consecutive radio frames, that is, each enhanced transmission of a preamble performed by the user equipment is repeatedly performed within the five consecutive radio frames.

Alternatively, when configuring the quantity of repetitions for each enhanced transmission of the preamble, the base station specifically configures a starting frame number list used to transmit the preamble within each radio frame period and a quantity of radio frames used to continuously transmit the preamble after each starting frame; the processing module 61 is specifically configured to: after the receiving module 60 receives the resource index of the time-domain resource configured for the coverage enhancement level by the base station, query for the starting frame number list used to transmit the preamble within each radio frame period and the quantity of radio frames used to continuously transmit the preamble after each starting frame, where the list and the quantity are corresponding to the resource index. For example, still using a configured time-domain resource at the Level 1 in Table 1 as an example, in Table 1, the processing module 61 may learn, by means of query, starting radio frame numbers that are used to transmit the preamble within each radio frame period and that are corresponding to all resource indexes. For example, starting radio frame numbers corresponding to an index 4 are the $0^{th}$ frame and the $40^{th}$ frame. In addition, in this embodiment, 10 frames after the $0^{th}$ starting radio frame and 10 frames after the 40th starting radio frame may be further directly configured to continuously transmit the preamble. Therefore, corresponding to the coverage enhancement level Level 1, when a resource configuration corresponding to the index 4 is used, a starting frame for one enhanced transmission is the $0^{th}$ frame, and the enhanced transmission occupies 10 consecutive radio frames, that is, each enhanced transmission of a preamble is repeatedly performed within the 10 consecutive radio frames. In this way, after the receiving module 60 receives the index 4, the processing module 61 can learn, by querying the table by using the index 4, that there are two enhanced transmission opportunities within a radio period of 80 frames at the coverage enhancement level Level 1, where the $0^{th}$ radio frame and the $40^{th}$ radio frame are separately used as starting points of the two enhanced transmission opportunities, and each enhanced transmission of a preamble is repeatedly performed within 10 consecutive radio frames.

During specific implementation, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level; and the processing module 61 is specifically configured to: after the receiving module 60 receives the resource index of the time-domain resource configured for the coverage enhancement level by the base station, query for the quantity of subframe numbers or the subframe number, where the subframe number is used to transmit the preamble in each radio frame, and the quantity or the subframe number is corresponding to the resource index, for example, still using a configured time-domain resource at the Level 1 in Table 1 as an example, the fifth column in Table 1 is a configured quantity of subframe numbers that are used to transmit the preamble in each radio frame. For example, referring to Table 1, it can be learnt, from the fourth column in Table 1, that, when a resource configuration of the index 4 is used for the coverage enhancement level Level 1, starting radio frame numbers used for enhanced transmissions of the preamble are the 0th frame and the 40th frame. The fifth column in Table 1 is further queried, and it may be learnt that there is one subframe number that is used to transmit the preamble in the 0th frame and the 40th frame. Therefore, after the base station delivers the index 4 of the time-domain resource to the user equipment, the user equipment using a resource at the coverage enhancement level Level 1 can learn, by means of query according to the index 4, that the starting radio frame numbers used for the enhanced transmissions of the preamble are the 0th frame and the 40th frame, and that there is one subframe number that is used to transmit the preamble in the 0th frame and the 40th frame. Certainly, during specific implementation, one column may be further added to Table 1 to indicate a subframe number that is used to transmit the preamble in each radio frame, so that the user equipment can learn the subframe number by means of query; or the processing module 61 is specifically configured to: after the receiving module 60 receives the resource index of the time-domain resource configured for the coverage enhancement level by the base station, query for the quantity, corresponding to the resource index, of subframe numbers that are used to transmit the preamble in each radio frame, and after the receiving module 60 receives a resource index configured for a resource at the non-coverage enhancement level by the base station, query for a subframe number that is used to transmit the preamble in each radio frame and that is corresponding to the resource index configured for the resource at the non-coverage enhancement level, where this manner differs from the foregoing manner in that, a subframe number configured for the resource at the non-coverage enhancement level may be directly used without reconfiguring a subframe number that is used for an enhanced transmission of the preamble in each radio frame. For details of resource configuration information of the non-coverage enhancement level, refer to Table 2, where "Subframe number" is a subframe number that may be specifically used for an enhanced transmission of a preamble.

In conclusion, in this embodiment, a transmission quantity, of a preamble, corresponding to one enhanced transmission is finally determined by a configured starting frame number of a radio frame for an enhanced transmission of a preamble, a quantity of radio frames used to continuously transmit the preamble after the starting frame number, and a quantity of subframes or a location of a subframe, where the subframe is used to transmit the preamble in each radio frame. For example, when a starting frame number of one radio frame used to transmit a preamble is set to 0, a quantity of radio frames used to continuously transmit the preamble after the starting frame number is set to 5, and a quantity of subframes that are used to transmit the preamble in each radio frame is set to 2, in response to one enhanced transmission at a corresponding coverage enhancement level, a preamble is repeatedly transmitted for 10 times.

During specific implementation, the PRACH resource includes a frequency-domain resource, the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the receiving module 60 is specifically configured to receive the frequency offset value configured for the coverage enhancement level by the base station.

During specific implementation, the receiving module 60 is specifically configured to receive a same frequency offset value configured for different coverage enhancement levels by the base station, and the processing module 61 is specifically configured to use the same frequency offset value as an offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the receiving module 60 is specifically configured to receive a same frequency offset value configured for different coverage enhancement levels by the base station, and the processing module 61 is specifically configured to use the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the receiving module 60 is specifically configured to receive a frequency offset value configured for each coverage enhancement level by the base station, and the processing module 61 is specifically configured to use the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

With reference to the foregoing Table 1 to Table 4, the base station (for example, an eNB) may transmit, in an SIB, an index configured for the time-domain resource corresponding to the supported coverage enhancement level. In addition, the base station may further transmit, in the SIB, a frequency offset value of the frequency-domain resource corresponding to the supported coverage enhancement level. For the two resource configurations, the configurations in the SIB may be as shown in code segment 1:

```
code segment 1:
  rootSequenceIndex              INTEGER (0..837),
  prach-ConfigIndex              INTEGER (0..63),
  prach_Level 1_ConfigIndex      INTEGER (0..219),
  prach_Level 2_ConfigIndex      INTEGER (0..139),
  prach_Level 3_ConfigIndex      INTEGER (0..59),
    highSpeedFlag                BOOLEAN,
    zeroCorrelationZoneConfig    INTEGER (0..15),
    prach-FreqOffset
INTEGER (0..94),
  prach_Level 1_FreqOffset       INTEGER (0..94),
  prach_Level 2_FreqOffset       INTEGER (0..94),
  prach_Level 3_FreqOffset       INTEGER (0..94).
```

In the foregoing configuration information, existence of resource configurations for which coverage enhancement levels Level indicates that the base station supports the corresponding coverage enhancement levels, where information segments of

| | |
|---|---|
| prach_Level 1_ConfigIndex | INTEGER (0..219), |
| prach_Level 2_ConfigIndex | INTEGER (0..139), and |
| prach_Level 3_ConfigIndex | INTEGER (0..59), | represent delivery of index information of time-domain resources, what are carried in INTEGER (0 . . . 219) are all resource indexes configured for the Level 1 by the base station in Table 1, what are carried in INTEGER (0 . . . 139) are all resource indexes configured for the Level 2 by the base station in Table 3, and what are carried in INTEGER (0 . . . 59) are all resource indexes configured for the Level 3 by the base station in Table 4. In this way, after receiving these indexes, the user equipment can obtain, by querying Table 1, a PRACH resource configured for the Level 1, obtain, by querying Table 3, a PRACH resource configured for the Level 2, and obtain, by querying Table 4, a PRACH resource configured for the Level 3. For example, assuming that the user equipment receives a system message including prach-ConfigIndex INTEGER (0) and prach_Level 1_ConfigIndex INTEGER (5) and indicating that 10 consecutive radio frames that are used to transmit a preamble repeatedly after a starting frame, the user equipment may acquire, by querying Table 1 by using the index 5, the following configuration information of the PRACH resource: a preamble format at the coverage enhancement level Level is 0, a radio frame period for an enhanced transmission of the preamble is 80 radio frames, there are two enhanced transmission opportunities for the preamble within the period of the 80 radio frames, and the two enhanced transmission opportunities start at the $20^{th}$ frame and the both frame respectively; however, there is one subframe number that is used for an enhanced transmission of the preamble in each radio frame. Further, the user equipment may acquire, by querying Table 2 by using the index 0, that the first subframe in each radio frame is used for an enhanced transmission of a preamble, and may learn, according to information that 10 consecutive radio frames are used to repeatedly transmit a preamble after a starting frame, that each repeated transmission of the preamble is continuously and repeatedly performed within the 10 frames after the starting frame of the transmission opportunity.

However, information segments of:

| | |
|---|---|
| prach_Level 1_FreqOffset | INTEGER (0..94), |
| prach_Level 2_FreqOffset | INTEGER (0..94), and |
| prach_Level 3_FreqOffset | INTEGER (0..94) | represent delivery of offset values of frequency-domain resources; and what is carried in prach_Level 1_FreqOffset INTEGER (0 . . . 94) is an offset of a frequency at the Level 1 with respect to the smallest carrier frequency, what is carried in prach_Level 2_FreqOffset INTEGER (0 . . . 94) is an offset of a frequency at the Level 2 with respect to the smallest carrier frequency, and what is carried in prach_Level 3_FreqOffset INTEGER (0 . . . 94) is an offset of a frequency at the Level 3 with respect to the smallest carrier frequency. For the FDD system, the smallest carrier frequency corresponds to a first physical resource block for a PRACH transmission opportunity, where the value is greater than or equal to 0, or less than or equal to a quantity of uplink carrier resource blocks minus 6.

During specific implementation, when frequency-domain resource locations configured for a coverage enhancement level and a non-coverage enhancement level by the base station are the same, that is, a frequency-domain offset corresponding to the coverage enhancement level is the same as a prach-FreqOffset value, and when time-domain resources configured for the coverage enhancement level and the non-coverage enhancement level by the base station overlap partially, the base station may configure, for the coverage enhancement level, a codeword resource different from that configured for the non-coverage enhancement level; configuration information of the codeword resource includes at least one of the following configured for each coverage enhancement level: a total quantity of preambles, a quantity of preambles corresponding to a group A, or a root sequence; and when the resource includes the codeword resource, the receiving module 60 is specifically configured to receive the configuration information of the codeword resource configured for each coverage enhancement level by the base station.

During specific implementation, the root sequence configured for each coverage enhancement level by the base station may be the same as a root sequence of a resource transmitted in a non-coverage enhancement way, but the total quantity of preambles configured for each coverage enhancement level and the quantity of preambles corresponding to the group A may be different from those of the resource transmitted in the non-coverage enhancement way. In this embodiment, a size of a message in the group A and a power offset value in a message in the group B may be further configured, so that a user that uses the resource at the coverage enhancement level compares the size of the message in the group A with a size of message 3 to be transmitted by the user, to determine whether a preamble codeword in the group A or a preamble codeword in the group B is used, and to determine, when the preamble codeword in the group B is used, a power offset value that needs to be used when message 3 is transmitted.

Certainly, during specific implementation, when frequency-domain resource locations configured for the coverage enhancement level and the non-coverage enhancement level by the base station are different, that is, a frequency-domain offset corresponding to the coverage enhancement level is different from a prach-FreqOffset value, and when time-domain resources configured for the coverage enhancement level and the non-coverage enhancement level by the base station do not overlap partially, the base station may not need to configure a codeword resource for the coverage enhancement level.

During specific implementation, the processing module 61 is specifically configured to: when the receiving module 60 receives the configuration information of the codeword resource including the total quantity of preambles, the quantity of preambles corresponding to the group A, and the root sequence that are configured for each coverage enhancement level, use the codeword information configured for the coverage enhancement level, to obtain a codeword for an enhanced transmission of the preamble; or the processing module 61 is specifically configured to: when the receiving module 60 receives the resource configuration information of the codeword resource including only a part of the following configured for each coverage enhancement level: the total quantity of preambles, the quantity of preambles corresponding to the group A, or the root sequence, use the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble. For example, assuming that the base station has configured the root sequence for each coverage enhancement level, but does not configure the total quantity of preambles and the quantity of preambles in the group A for each coverage enhancement level, the user equipment uses, when to obtain a codeword corresponding to the coverage enhancement level, the root sequence configured for the coverage enhancement level by the base station and a total quantity of preambles and a quantity of preambles in the group A that are configured for a non-coverage enhancement level, to obtain the codeword; or the processing module 61 is specifically configured to: when the receiving module 60 does not receive the configuration information of the codeword resource, use configuration information of a codeword resource configured for a non-coverage enhancement level, to obtain a codeword for an enhanced transmission of the preamble, that is, the user equipment uses a codeword resource that is used by the user and that is configured for a resource transmitted in a non-coverage enhancement way, to obtain the codeword, where the codeword resource includes a root sequence, a total quantity of preambles, a quantity of preambles in the group A, a size of message 3 in the group A, a power offset value during transmission of message 3 in the group B, or the like.

In this embodiment, an example of a manner of configuring root sequences of preambles for a non-coverage enhancement level and a coverage enhancement level by the base station is shown as the foregoing code segment 2. Details are not repeatedly described herein. In this embodiment, an example of a manner of configuring total quantities of preambles and quantities of preambles in the group A for a non-coverage enhancement level and a coverage enhancement level by the base station is shown as the foregoing code segment 3. Details are not repeatedly described herein.

It can be seen from above that in some embodiments, user equipment receives a resource index and/or resource configuration information of a PRACH resource configured for a coverage enhancement level by a base station; and the user equipment acquires the corresponding PRACH resource according to the received resource index and/or resource configuration information, and transmits a preamble on the acquired PRACH resource. Therefore, a PRACH resource can be configured for user equipment that works in a coverage enhancement mode.

Figure 7:
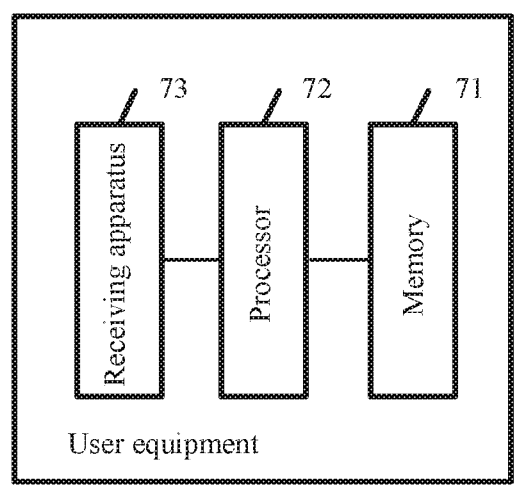
FIG. 7 is a schematic structural composition diagram of another embodiment of user equipment according to the embodiments.

FIG. 7 is a schematic structural composition diagram of another embodiment of user equipment according to embodiments. As shown in FIG. 7, the user equipment may include a memory 71, a processor 72, and a receiving apparatus 73.

The receiving apparatus 73 is configured to receive a resource index and/or resource configuration information of a PRACH resource configured for a coverage enhancement level by a base station.

The processor 72 is configured to: execute a program stored in the memory 71, so as to acquire the corresponding PRACH resource according to the resource index and/or resource configuration information received by the receiving apparatus 73, and transmit a preamble on the acquired PRACH resource.

In some feasible implementation manners, the PRACH resource includes a time-domain resource, and resource configuration information of the time-domain resource includes at least one of: a preamble format, a density of enhanced transmission opportunities of a preamble, a transmission opportunity of a preamble for an enhanced transmission at a density, or a quantity of repetitions for each enhanced transmission of a preamble.

When the resource includes the time-domain resource, the receiving apparatus 73 is specifically configured to receive a resource index of a time-domain resource configured for the one or more coverage enhancement levels by the base station, where each index is corresponding to resource configuration information of one time-domain resource.

In some feasible implementation manners, when configuring the density of the enhanced transmission opportunities of the preamble and the enhanced transmission opportunity of the preamble at the density, the base station specifically configures a radio frame period for an enhanced transmission of the preamble and a starting radio frame number list used to transmit the preamble within each radio frame period; and the processor 72 is specifically configured to: after the receiving apparatus 73 receives the resource index of the time-domain resource configured for the coverage enhancement level by the base station, query for the radio frame period for the enhanced transmission of the preamble and a starting radio frame number used to transmit the preamble within each radio frame period, to determine the radio frame period for the enhanced transmission of the preamble and the radio frame number, where the radio frame period and the starting radio frame number are corresponding to the resource index.

In some feasible implementation manners, when configuring the quantity of repetitions for each enhanced transmission of the preamble, the base station specifically configures the starting radio frame number list used to transmit the preamble within each radio frame period, where a quantity of frames between every two radio frame numbers in a list, including a maximum of radio frame numbers, of the radio frame number lists indicates a quantity of radio frames used to continuously transmit the preamble; and the processor 72 is specifically configured to: after the receiving apparatus 73 receives all resource indexes of time-domain resources configured for the coverage enhancement level by the base station, query, according to the resource indexes, for the radio frame number list including the maximum of starting radio frame numbers used to transmit the preamble within each radio frame period, to determine the quantity of radio frames used to continuously transmit the preamble; or when configuring the quantity of repetitions for each enhanced transmission of the preamble, the base station specifically configures a starting frame number list used to transmit the preamble within each radio frame period and a quantity of radio frames used to continuously transmit the preamble after each starting frame; and the processor 72 is specifically configured to: after the receiving apparatus 73 receives the resource index of the time-domain resource configured for the coverage enhancement level by the base station, query for the starting frame number list used to transmit the preamble within each radio frame period and the quantity of radio frames used to continuously transmit the preamble after each starting frame, where the list and the quantity are corresponding to the resource index.

In some feasible implementation manners, when configuring the quantity of repetitions for each enhanced transmission of the preamble, the base station further configures a quantity of subframe numbers or a subframe number, where the subframe number is used to transmit the preamble in each radio frame, and the subframe number that is used to transmit the preamble in each radio frame is the same as or is different from a resource configuration configured for usage of a non-coverage enhancement level; and the processor 72 is specifically configured to: after the receiving apparatus 73 receives the resource index of the time-domain resource configured for the coverage enhancement level by the base station, query for the quantity of subframe numbers or the subframe number, where the subframe number is used to transmit the preamble in each radio frame, and the quantity or the subframe number is corresponding to the resource index; or the processor 72 is specifically configured to: after the receiving apparatus 73 receives the resource index of the time-domain resource configured for the coverage enhancement level by the base station, query for the quantity, corresponding to the resource index, of subframe numbers that are used to transmit the preamble in each radio frame, and after the receiving apparatus 73 receives a resource index configured for a resource at the non-coverage enhancement level by the base station, query for a subframe number that is used to transmit the preamble in each radio frame and that is corresponding to the resource index configured for the resource at the non-coverage enhancement level.

In some feasible implementation manners, the PRACH resource includes a frequency-domain resource, the frequency-domain resource includes a frequency offset value, and the frequency offset value indicates an offset of a starting location, with respect to a starting location of a carrier frequency band, for an enhanced transmission of a preamble at each coverage enhancement level, or the frequency offset value indicates frequency-domain frequency separation for enhanced transmissions of preambles at all coverage enhancement levels supported by the base station; and when the resource includes the frequency-domain resource, the receiving apparatus 73 is specifically configured to receive the frequency offset value configured for the coverage enhancement level by the base station.

In some feasible implementation manners, the receiving apparatus 73 is specifically configured to receive a same frequency offset value configured for different coverage enhancement levels by the base station, and the processor 72 is specifically configured to use the same frequency offset value as an offset of starting locations, with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or the receiving apparatus 73 is specifically configured to receive a same frequency offset value configured for different coverage enhancement levels by the base station, and the processor 72 is specifically configured to use the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or the receiving apparatus 73 is specifically configured to receive a frequency offset value configured for each coverage enhancement level by the base station, and the processor 72 is specifically configured to use the frequency offset value for each coverage enhancement level as an offset of a starting location, with respect to the starting location of the carrier frequency band, for an enhanced transmission of a preamble at the corresponding coverage enhancement level, to obtain a starting frequency location for the enhanced transmission of the preamble at the corresponding coverage enhancement level.

In some feasible implementation manners, the PRACH resource further includes a codeword resource; configuration information of the codeword resource includes at least one of the following configured for each coverage enhancement level: a total quantity of preambles, a quantity of preambles corresponding to a group A, or a root sequence; and when the resource includes the codeword resource, the receiving apparatus 73 is specifically configured to receive the configuration information of the codeword resource configured for each coverage enhancement level by the base station.

In some feasible implementation manners, the processor 72 is specifically configured to: when the receiving apparatus 73 receives the configuration information of the codeword resource including the total quantity of preambles, the quantity of preambles corresponding to the group A, and the root sequence that are configured for each coverage enhancement level, use the codeword information configured for the coverage enhancement level, to obtain a codeword for an enhanced transmission of the preamble; or the processor 72 is specifically configured to: when the receiving apparatus 73 receives the resource configuration information of the codeword resource including only a part of the following configured for each coverage enhancement level: the total quantity of preambles, the quantity of preambles corresponding to the group A, or the root sequence, use the configuration information of the codeword resource configured for the coverage enhancement level and configuration information of a codeword resource, deficient in the configuration information of the codeword resource configured for the coverage enhancement level, configured for the resource at the non-coverage enhancement level, to obtain a codeword for an enhanced transmission of the preamble; or the processor 72 is specifically configured to: when the receiving apparatus 73 does not receive the configuration information of the codeword resource, use configuration information of a codeword resource configured for a non-coverage enhancement level, to obtain a codeword for an enhanced transmission of the preamble.

In addition, an embodiment further provides a computer storage medium. The computer storage medium may store a program. When the program is executed, some or all steps of the method according to the embodiments may be performed.

Obviously, a person skilled in the art can make various modifications and variations to the embodiments without departing from the spirit and scope of the embodiments. The embodiments are intended to cover these modifications and variations of the embodiments provided that they fall within the scope of protection defined by the following claims of the embodiments and their equivalent technologies.

What is claimed is:

1. A method comprising:
   configuring, by a base station, a supported coverage enhancement level and a first physical random access channel (PRACH) resource corresponding to the supported coverage enhancement level for enhanced PRACH communication between the base station and a user equipment;
   transmitting, by the base station to the user equipment, a resource index identifying a first PRACH configuration from a plurality of PRACH configurations according to the supported coverage enhancement level and the first PRACH resource, each of the plurality of PRACH configurations specifying a PRACH resource associated with a coverage enhancement level for enhanced communication of PRACH preambles, and the first PRACH configuration specifying the first PRACH resource associated with the supported coverage enhancement level; and
   receiving, by the base station from the user equipment, an enhanced transmission of a first preamble of a PRACH that is transmitted in the first PRACH resource according to the first PRACH configuration identified by the resource index.

2. The method according to claim 1:
   wherein the PRACH resource comprises a time-domain resource;
   wherein resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and
   wherein the method further comprises transmitting, by the base station to the user equipment, the resource index of the time-domain resource comprised in the first PRACH resource configured for the supported coverage enhancement level, in response to the first PRACH resource comprising the time-domain resource, wherein each index corresponds to resource configuration information of one time-domain resource.

3. The method according to claim 1:
   wherein the PRACH resource comprises a frequency-domain resource;
   wherein resource configuration information of the PRACH resource comprising the frequency-domain resource comprises a frequency offset value;
   wherein the frequency offset value indicates an offset of a starting location with respect to a starting location of a carrier frequency band for an enhanced transmission of a preamble at each coverage enhancement level, or wherein the frequency offset value indicates frequency-domain frequency separation for enhanced transmissions of preambles at different coverage enhancement levels supported by the base station; and wherein the method further comprises transmitting, by the base station to the user equipment, the frequency offset value configured for the coverage enhancement level in response to the PRACH resource comprising the frequency-domain resource.

4. The method according to claim 3, further comprising:

configuring a same frequency offset value for different coverage enhancement levels to indicate a same offset of starting locations with respect to the starting location of the carrier frequency band, for enhanced transmissions of preambles at all coverage enhancement levels supported by the base station; or configuring a same frequency offset value for different coverage enhancement levels, to indicate same frequency separation between each coverage enhancement level and a previous adjacent coverage enhancement level; or configuring multiple different frequency offset values, wherein each frequency offset value is used to indicate a frequency offset of a starting location with respect to the starting location of the carrier frequency band, for an enhanced transmission of a preamble at a coverage enhancement level.

5. The method according to claim 1, wherein:

the PRACH resource comprises a time-domain resource, and resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and when the PRACH resource comprises the time-domain resource, the base station transmits, to the user equipment, the resource index of the time-domain resource comprised in the PRACH resource configured for the coverage enhancement level, wherein each index corresponds to resource configuration information of one time-domain resource.

6. A method comprising:

receiving, by an apparatus from a base station, a resource index identifying a first PRACH configuration from a plurality of PRACH configurations, each of the plurality of PRACH configurations specifying a PRACH resource associated with a coverage enhancement level for enhanced communication of PRACH preambles;

acquiring, by the apparatus, the first PRACH configuration according to the received resource index, the first PRACH configuration comprising a first PRACH resource associated with a first coverage enhancement level; and transmitting, by the apparatus to the base station, a first preamble on the first PRACH resource at the first coverage enhancement level according to the first PRACH configuration.

7. The method according to claim 6:

wherein the PRACH resource comprises a time-domain resource;

wherein resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and wherein the method further comprises receiving the resource index of the time-domain resource comprised in the PRACH resource configured for the coverage enhancement level by the base station, in response to the PRACH resource comprising the time-domain resource, wherein each index corresponds to resource configuration information of one time-domain resource.

8. The method according to claim 6:

wherein the PRACH resource comprises a frequency-domain resource;

wherein resource configuration information of the PRACH resource comprising the frequency-domain resource comprises a frequency offset value;

wherein the frequency offset value indicates an offset of a starting location with respect to a starting location of a carrier frequency band for an enhanced transmission of a preamble at each coverage enhancement level, or the frequency offset value indicating frequency-domain frequency separation for enhanced transmissions of preambles at all coverage enhancement levels supported by the base station; and wherein the method further comprises receiving the frequency offset value configured for the coverage enhancement level by the base station in response to the PRACH resource comprising the frequency-domain resource.

9. The method according to claim 8, further comprising:

receiving a same frequency offset value configured for different coverage enhancement levels by the base station and using the same frequency offset value as an offset of starting locations with respect to the starting location of the carrier frequency band for the enhanced transmissions of the preambles at all the coverage enhancement levels supported by the base station, to obtain starting frequency locations for the enhanced transmissions of the preambles at all the coverage enhancement levels supported by the base station; or receiving a same frequency offset value configured for different coverage enhancement levels by the base station, and using the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or receiving a frequency offset value configured for each coverage enhancement level by the base station, and using the frequency offset value for each coverage enhancement level as an offset of a starting location with respect to the starting location of the carrier frequency band for an enhanced transmission of a preamble at a corresponding coverage enhancement level, to obtain a starting frequency location for the enhanced transmission of the preamble at the corresponding coverage enhancement level.

10. The method according to claim 6, wherein:

the PRACH resource comprises a time-domain resource, and resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and when the PRACH resource comprises the time-domain resource, the apparatus receives the resource index of the time-domain resource comprised in the PRACH resource configured for the coverage enhancement level by the base station, wherein each index corresponds to resource configuration information of one time-domain resource.

11. A base station, comprising:
a non-transitory memory comprising instructions; and
a processor, wherein the processor is configured to communicate with the memory, and execute the instructions to:
    configure a supported coverage enhancement level and a first physical random access channel (PRACH) resource corresponding to the supported coverage enhancement level;
    transmit a resource index identifying a first PRACH configuration from a plurality of PRACH configurations according to the supported coverage enhancement level and the first PRACH resource, each of the plurality of PRACH configurations specifying a PRACH resource associated with a coverage enhancement level for enhanced communication of PRACH preambles, and the first PRACH configuration specifying the first PRACH resource associated with the supported coverage enhancement level; and
    receive an enhanced transmission of a first preamble of a PRACH in the first PRACH resource according to the first PRACH configuration identified by the resource index.

12. The base station according to claim ii, wherein the PRACH resource comprises a time-domain resource, and resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and
    wherein the processor is further configured to execute the instructions to, when the PRACH resource comprises the time-domain resource, transmit the resource index of the time-domain resource configured for the coverage enhancement level, wherein each index is corresponding to resource configuration information of one time-domain resource.

13. The base station according to claim 11:
wherein the PRACH resource comprises a frequency-domain resource;
wherein resource configuration information of the PRACH resource comprising the frequency-domain resource comprises a frequency offset value;
wherein the frequency offset value indicates an offset of a starting location, with respect to a starting location of a carrier frequency band, for an enhanced transmission of a preamble at each coverage enhancement level, or wherein the frequency offset value indicates frequency-domain frequency separation for enhanced transmissions of preambles at all coverage enhancement levels supported by the base station; and
wherein the processor is configured to execute the instructions to: transmit a frequency offset value configured for each coverage enhancement level in response to the PRACH resource comprising the frequency-domain resource.

14. The base station according to claim 13, wherein the processor is configured to further execute the instructions to:
    configure a same frequency offset value for different coverage enhancement levels to indicate a same offset of starting locations with respect to the starting location of the carrier frequency band, for enhanced transmissions of preambles at all coverage enhancement levels supported by the base station; or
    configure a same frequency offset value for different coverage enhancement levels, to indicate same frequency separation between each coverage enhancement level and a previous adjacent coverage enhancement level; or
    configure multiple different frequency offset values, wherein each frequency offset value is used to indicate a frequency offset of a starting location with respect to the starting location of the carrier frequency band, for an enhanced transmission of a preamble at a coverage enhancement level.

15. The base station according to claim 11, wherein the processor is configured to execute the instructions to:
    configure the coverage enhancement level currently supported by the base station and the PRACH resource corresponding to the coverage enhancement level, or configure all coverage enhancement levels supported by the base station and PRACH resources corresponding to all the coverage enhancement levels and indicate the coverage enhancement level currently supported by the base station.

16. An apparatus, comprising:
a non-transitory memory comprising instructions; and
a processor, wherein the processor is configured to communicate with the memory, and execute the instructions to:
receive a resource index identifying a first PRACH configuration from a plurality of PRACH configurations, each of the plurality of PRACH configurations specifying a PRACH resource associated with a coverage enhancement level for enhanced communication of PRACH preambles;
acquire the first PRACH configuration according to the received resource index, the first PRACH configuration comprising a first PRACH resource associated with a first coverage enhancement level; and
transmit a first preamble on the first PRACH resource at the first coverage enhancement level according to the first PRACH configuration.

17. The apparatus according to claim 16:
wherein the PRACH resource comprises a time-domain resource;
wherein resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and
wherein the processor is further configured to receive, using a receiver, the resource index of the time-domain resource configured for the coverage enhancement level by a base station, in response to the PRACH resource comprising the time-domain resource, wherein each index corresponds to resource configuration information of one time-domain resource.

18. The apparatus according to claim 16:
wherein the PRACH resource comprises a frequency-domain resource;

wherein frequency-domain resource comprises a frequency offset value,
wherein the frequency offset value indicates an offset of a starting location with respect to a starting location of a carrier frequency band, for an enhanced transmission of a preamble at each coverage enhancement level, or wherein the frequency offset value indicates frequency-domain frequency separation for enhanced transmissions of preambles at all coverage enhancement levels supported by a base station; and
wherein the processor is further configured to execute the instructions to:
receive the frequency offset value configured for the coverage enhancement level by the base station in response to the PRACH resource comprising the frequency-domain resource.

19. The apparatus according to claim 18:
wherein the processor is further configured to execute the instructions to:
receive a same frequency offset value configured for different coverage enhancement levels by the base station, and wherein the processor is further configured to execute the instructions to use the same frequency offset value as an offset of starting locations with respect to the starting location of the carrier frequency band, for the enhanced transmissions of the preambles at all the coverage enhancement levels supported by the base station, to obtain starting frequency locations for the enhanced transmissions of the preambles at all the coverage enhancement levels supported by the base station; or
receive a same frequency offset value configured for different coverage enhancement levels by the base station, and wherein the processor is further configured to execute the instructions to use the same frequency offset value as frequency separation between starting locations for the enhanced transmissions of the preambles at all the coverage enhancement levels supported by the base station, to obtain starting frequency locations for the enhanced transmissions of the preambles at all the coverage enhancement levels supported by the base station; or
receive a frequency offset value configured for each coverage enhancement level by the base station, and wherein the processor is further configured to execute the instructions to use the frequency offset value for each coverage enhancement level as an offset of a starting location with respect to the starting location of the carrier frequency band, for an enhanced transmission of a preamble at a corresponding coverage enhancement level, to obtain a starting frequency location for the enhanced transmission of the preamble at the corresponding coverage enhancement level.

20. The apparatus according to claim 16, wherein:
the PRACH resource comprises a time-domain resource, and resource configuration information of the PRACH resource comprising the time-domain resource comprises: a preamble format, a density of enhanced transmission opportunities of a preamble, a transmission opportunity of a preamble for an enhanced transmission at a density, or a quantity of repetitions for each enhanced transmission of a preamble; and
the processor is configured to execute the instructions to:
when the PRACH resource comprises the time-domain resource, receive the resource index of the PRACH resource comprising the time-domain resource configured for the coverage enhancement level by a base station, wherein each index corresponds to resource configuration information of one time-domain resource.

* * * * *